United States Patent
Yang et al.

(10) Patent No.: US 9,088,504 B2
(45) Date of Patent: Jul. 21, 2015

(54) SYSTEMS AND METHODS FOR WIRELESS COMMUNICATION OF LONG DATA UNITS

(71) Applicant: Qualcomm Incorporated, San Diego, CA (US)

(72) Inventors: Lin Yang, San Diego, CA (US); Didier Johannes Richard Van Nee, De Meern (NL); Sameer Vermani, San Diego, CA (US); Hemanth Sampath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/710,296

(22) Filed: Dec. 10, 2012

(65) Prior Publication Data

US 2013/0177090 A1 Jul. 11, 2013

Related U.S. Application Data

(60) Provisional application No. 61/583,879, filed on Jan. 6, 2012, provisional application No. 61/584,170, filed on Jan. 6, 2012.

(51) Int. Cl.
*H04W 4/00* (2009.01)
*H04L 12/24* (2006.01)
(Continued)

(52) U.S. Cl.
CPC .............. *H04L 41/16* (2013.01); *H04L 5/0023* (2013.01); *H04L 25/0232* (2013.01); *H04L 27/2602* (2013.01); *H04L 5/0048* (2013.01); *H04L 5/0053* (2013.01); *H04L 5/0091* (2013.01)

(58) Field of Classification Search
CPC ..... H04W 24/02; H04W 72/46; H04L 5/0048
See application file for complete search history.

(56) References Cited

U.S. PATENT DOCUMENTS 6,697,351 B1 2/2004 Kuzminskiy et al.
2007/0248175 A1* 10/2007 Bruninghaus et al. ........ 375/260
(Continued)

FOREIGN PATENT DOCUMENTS

EP 1693972 A2 8/2006
WO 2006086493 A1 8/2006
(Continued)

OTHER PUBLICATIONS

Co-pending U.S. Appl. No. 13/455,582, filed Apr. 25, 2012.
(Continued)

*Primary Examiner* — John Blanton
(74) *Attorney, Agent, or Firm* — S. Hossain Beladi

(57) ABSTRACT

Systems, methods, and devices for communicating long packets are described herein. In one aspect, an apparatus for wireless communication includes a receiver and a processor. The receiver wirelessly receives via wireless local area network a data unit comprising a plurality of training fields interposed between data symbols. The plurality of training fields includes a first training field followed by a second training field. The first training field includes a gain control sequence, and the second training field includes a channel estimation sequence. The processor decodes at least one data symbol based on the plurality of training fields. In another aspect, an apparatus for wireless communication includes a processor and a transmitter. The processor generates a data unit comprising a plurality of training fields inserted between data symbols, and the transmitter wirelessly transmits the data unit via wireless local area network.

20 Claims, 14 Drawing Sheets

(51) Int. Cl.
*H04L 5/00* (2006.01)
*H04L 25/02* (2006.01)
*H04L 27/26* (2006.01)

(56) References Cited

U.S. PATENT DOCUMENTS

| | | | |
|---|---|---|---|
| 2008/0069265 | A1 | 3/2008 | Ludvigsen |
| 2010/0040084 | A1 | 2/2010 | Seyedi-Esfahani et al. |
| 2010/0091911 | A1 | 4/2010 | Sawai et al. |
| 2011/0116565 | A1* | 5/2011 | Mujtaba .................. 375/260 |
| 2012/0027119 | A1 | 2/2012 | Shearer |
| 2012/0127940 | A1* | 5/2012 | Lee et al. ................ 370/329 |
| 2012/0236971 | A1 | 9/2012 | Taghavi et al. |
| 2013/0107981 | A1 | 5/2013 | Sampath et al. |
| 2013/0128807 | A1 | 5/2013 | Vermani et al. |

FOREIGN PATENT DOCUMENTS

| | | |
|---|---|---|
| WO | 2011031058 A2 | 3/2011 |
| WO | 2012010607 A1 | 1/2012 |
| WO | 2012122119 A1 | 9/2012 |
| WO | 2012149394 A1 | 11/2012 |
| WO | 2012158961 A1 | 11/2012 |

OTHER PUBLICATIONS

Co-pending U.S. Appl. No. 13/471,947, filed May 15, 2012.

International Search Report and Written Opinion—PCT/US2012/071053—ISA/EPO—Mar. 27, 2013.

Vermani S., "Preamble format for 1 Mhz", Nov. 7, 2011, XP55035936, Retrieved from the Internet: URL:https://mentor.ieee.org/mentor/bp/Startpage, [retrieved on Aug. 21, 2012].

Porat, "Doppler Bit Indication", Broadcom, Dec. 5, 2011, pp. 4.

Dong, M., et al., "Optimal design and placement of pilot symbols for channel estimation," IEEE Transactions on Signal Processing, vol. 50, No. 12, Dec. 2002, pp. 3055-3069.

* cited by examiner

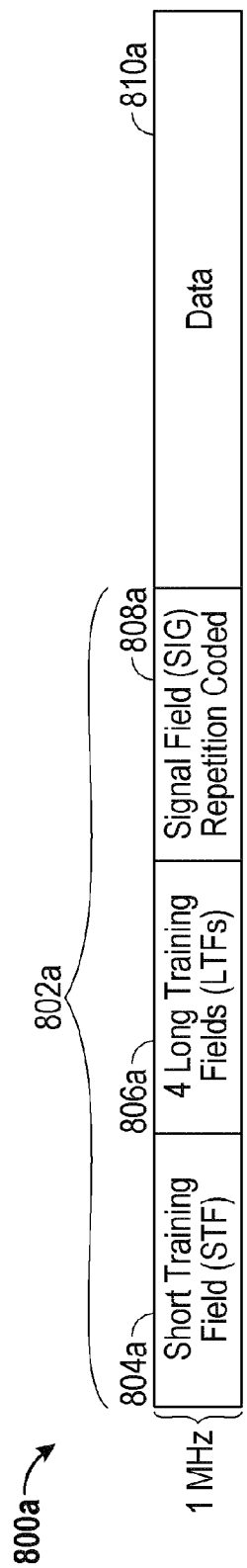
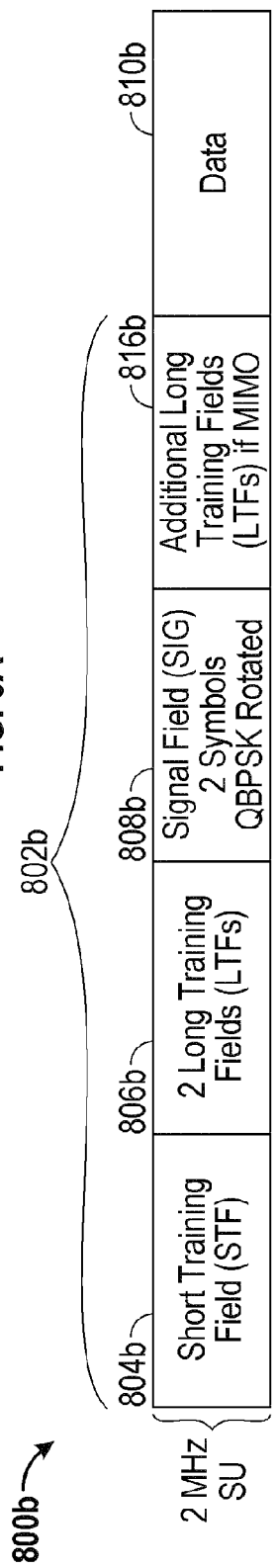
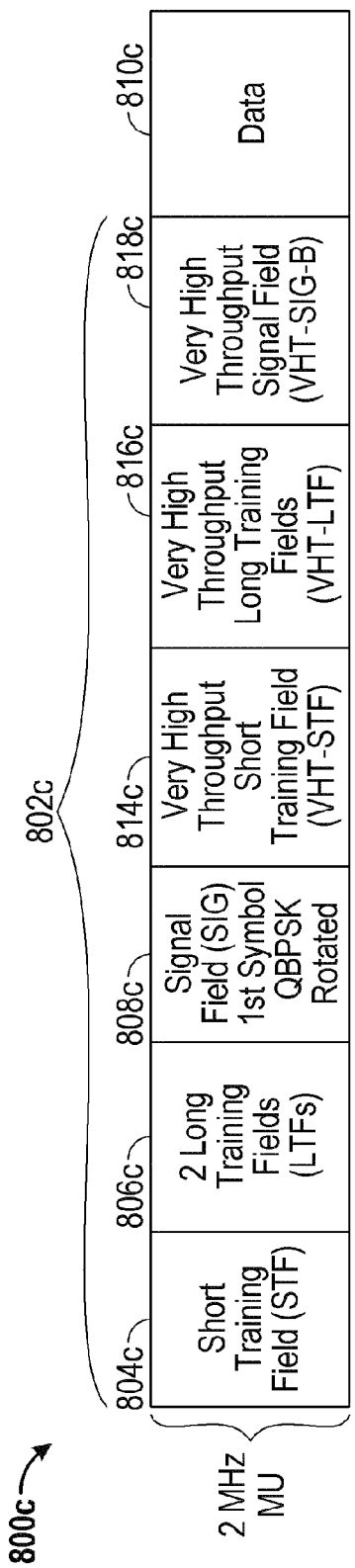
FIG. 8A
FIG. 8B
FIG. 8C

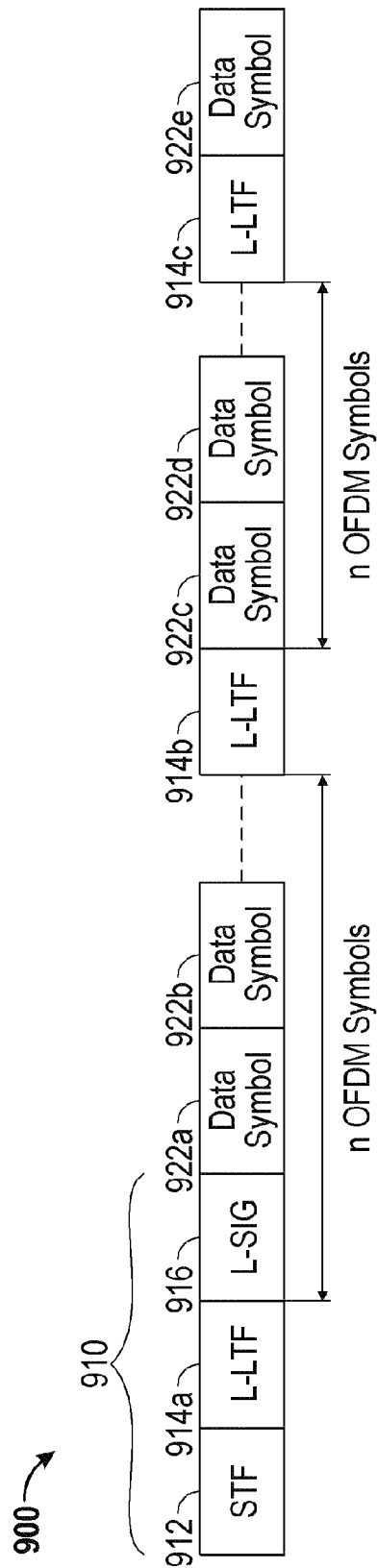
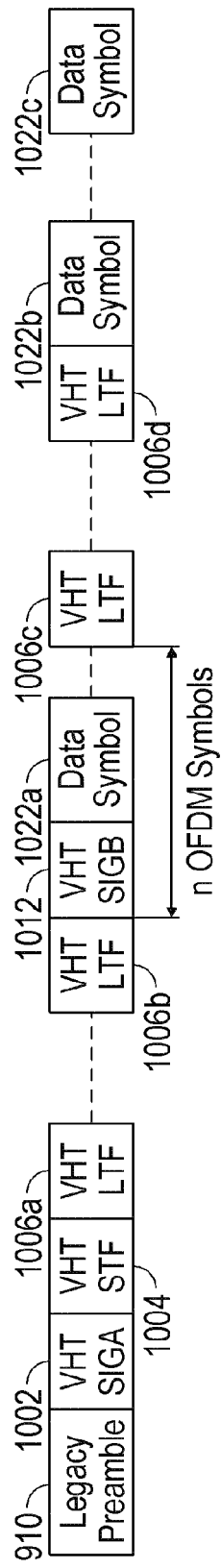
FIG. 9
FIG. 10

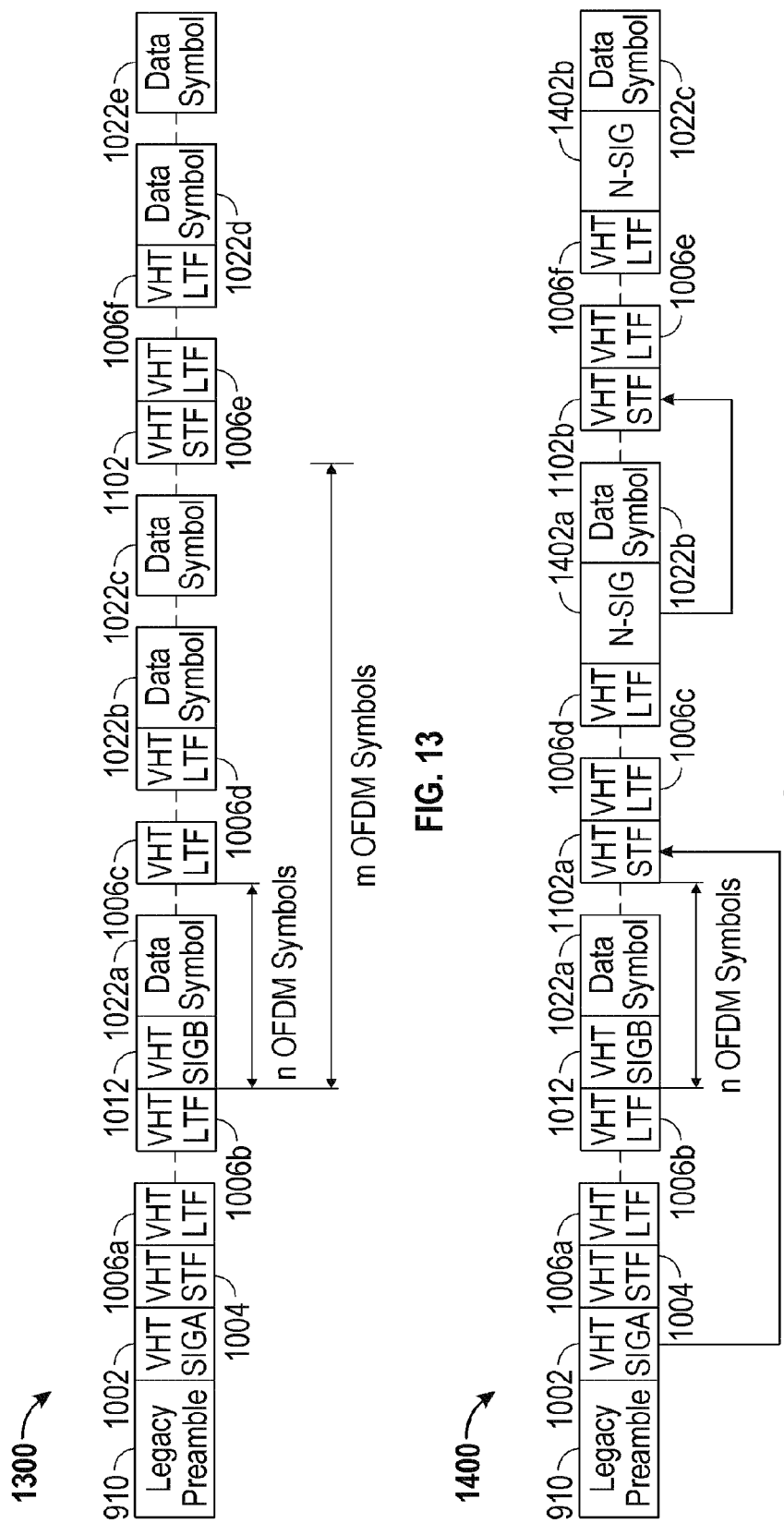

FIG. 19

| DGI | LTS | LTS | GI | LTS | LTS | GI | LTS |

1940 — DGI
1930a — LTS
1930b — LTS
1942a — GI
1930c — LTS
1942b — GI
1930d — LTS
1900

FIG. 20

| GI | LTS | GI | LTS | GI | LTS | GI | LTS |

2042a — GI
2030a — LTS
2042b — GI
2030b — LTS
2042c — GI
2030c — LTS
2042d — GI
2030d — LTS
2000

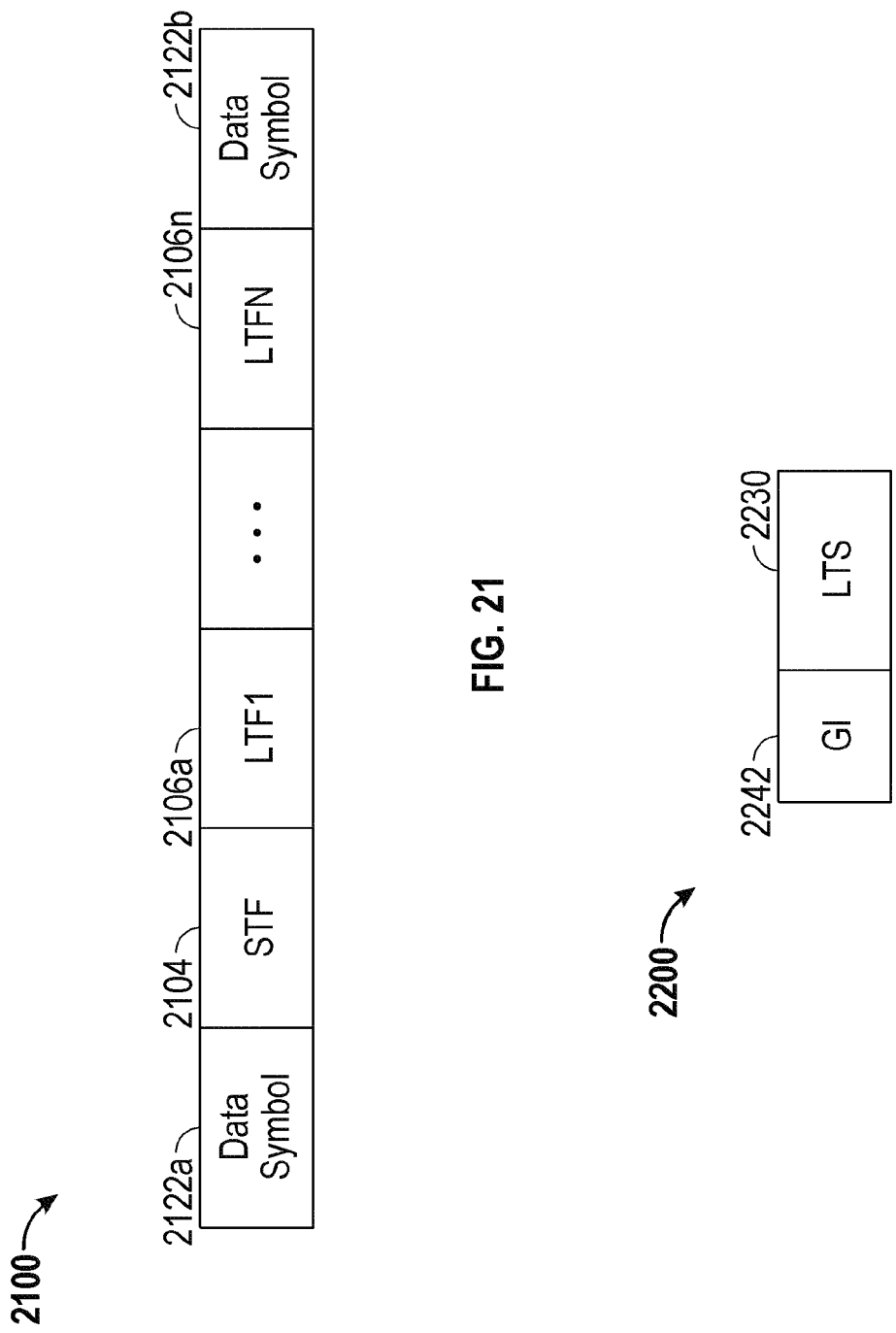

SYSTEMS AND METHODS FOR WIRELESS COMMUNICATION OF LONG DATA UNITS

CROSS REFERENCE TO RELATED APPLICATIONS

This application claims benefit under 35 U.S.C. §119(e) to U.S. Provisional Patent Application No. 61/583,879 entitled "SYSTEMS AND METHODS FOR WIRELESS COMMUNICATION OF LONG DATA UNITS" filed on Jan. 6, 2012, the disclosure of which is hereby incorporated by reference in its entirety. This application additionally claims benefit under 35 U.S.C. §119(e) to U.S. Provisional Patent Application No. 61/584,170 entitled "SYSTEMS AND METHODS FOR WIRELESS COMMUNICATION OF LONG DATA UNITS" filed on Jan. 6, 2012, the disclosure of which is hereby incorporated by reference in its entirety.

FIELD

The present application relates generally to wireless communications, and more specifically to systems, methods, and devices for communicating long data units. Certain aspects herein relate to data units including multiple training fields interposed between data symbols.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between one another. The information may comprise packets, which in some aspects may be referred to as data units. The packets may include overhead information (e.g., header information, packet properties, etc.) used in routing the packet through the network, identifying the data in the packet, processing the packet, etc., as well as data, such as user data, multimedia content, etc. carried in a payload of the packet.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved decoding of a packet to account for changing conditions of a channel over which the packet is received.

One aspect of the disclosure provides an apparatus for wireless communication that includes a receiver and a processor. The receiver is configured to wirelessly receive via wireless local area network a data unit comprising a plurality of training fields interposed between data symbols. The plurality of training fields includes a first training field followed by a second training field. The first training field includes a gain control sequence, and the second training field includes a channel estimation sequence. The processor is configured to decode at least one data symbol based on the plurality of training fields.

Another aspect of the disclosure provides an apparatus for wireless communication that includes a processor and a transmitter. The processor is configured to generate a data unit comprising a plurality of training fields inserted between data symbols. The plurality of training fields includes a first training field followed by a second training field. The first training field includes a gain control sequence, and the second training field includes a channel estimation sequence. The transmitter is configured to wirelessly transmit the data unit via wireless local area network.

Another aspect of the disclosure provides a method of wireless communication, comprising: wirelessly receiving via wireless local area network a data unit comprising a plurality of training fields interposed between data symbols, the plurality of training fields comprising a first training field followed by a second training field, the first training field including a gain control sequence, the second training field including a channel estimation sequence; and decoding at least one data symbol based on the plurality of training fields.

Another aspect of the disclosure provides a method of wireless communication, comprising: generating a data unit comprising a plurality of training fields inserted between data symbols, the plurality of training fields comprising a first training field followed by a second training field, the first training field including a gain control sequence, the second training field including a channel estimation sequence; and wirelessly transmitting via wireless local area network the data unit.

Another aspect of the disclosure provides an apparatus for wireless communication, comprising: means for wirelessly receiving via wireless local area network a data unit comprising a plurality of training fields interposed between data symbols, the plurality of training fields comprising a first training field followed by a second training field, the first training field including a gain control sequence, the second training field including a channel estimation sequence; and means for decoding at least one data symbol based on the plurality of training fields.

Another aspect of the disclosure provides an apparatus for wireless communication, comprising: means for generating a data unit comprising a plurality of training fields inserted between data symbols, the plurality of training fields comprising a first training field followed by a second training field, the first training field including a gain control sequence, the second training field including a channel estimation sequence; and means for wirelessly transmitting via wireless local area network the data unit.

Another aspect of the disclosure provides a non-transitory computer-readable medium comprising instructions that when executed cause an apparatus to: wirelessly receive via wireless local area network a data unit comprising a plurality of training fields interposed between data symbols, the plurality of training fields comprising a first training field followed by a second training field, the first training field including a gain control sequence, the second training field including a channel estimation sequence; and decode at least one data symbol based on the plurality of training fields.

Another aspect of the disclosure provides a non-transitory computer-readable medium comprising instructions that when executed cause an apparatus to: generate a data unit comprising a plurality of training fields inserted between data symbols, the plurality of training fields comprising a first training field followed by a second training field, the first training field including a gain control sequence, the second training field including a channel estimation sequence; and wirelessly transmit via wireless local area network the data unit.

BRIEF DESCRIPTION OF THE DRAWINGS

FIG. 8A is a block diagram showing an exemplary structure of a preamble and payload of a physical layer packet for transmission over a bandwidth of substantially 1 MHz.

FIG. 8B is a block diagram showing an exemplary structure of a preamble and payload of a physical layer packet for transmission over a bandwidth of substantially 2 MHz according to a single user mode.

FIG. 8C is a block diagram showing an exemplary structure of a preamble and payload of a physical layer packet for transmission over a bandwidth of substantially 2 MHz according to a multi user mode.

FIG. 9 illustrates an example of a physical layer data unit.
FIG. 10 illustrates an example of a physical layer data unit.
FIG. 13 illustrates an example of a physical layer data unit.
FIG. 14 illustrates an example of a physical layer data unit.
FIG. 19 illustrates an example LTF.
FIG. 20 illustrates an example LTF.
FIG. 21 illustrates an example portion of a physical layer data unit.
FIG. 22 illustrates an example LTF.

DETAILED DESCRIPTION

Figure 1:
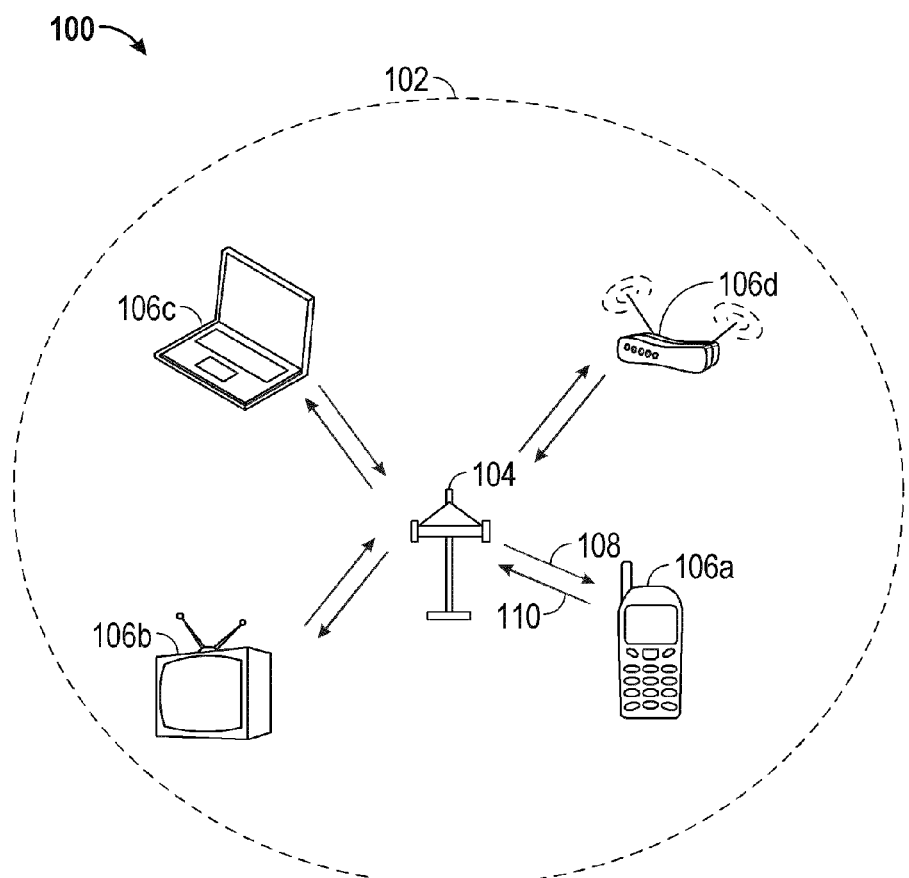
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

Certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106a, 106b, 106c, 106d (collectively STAs 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
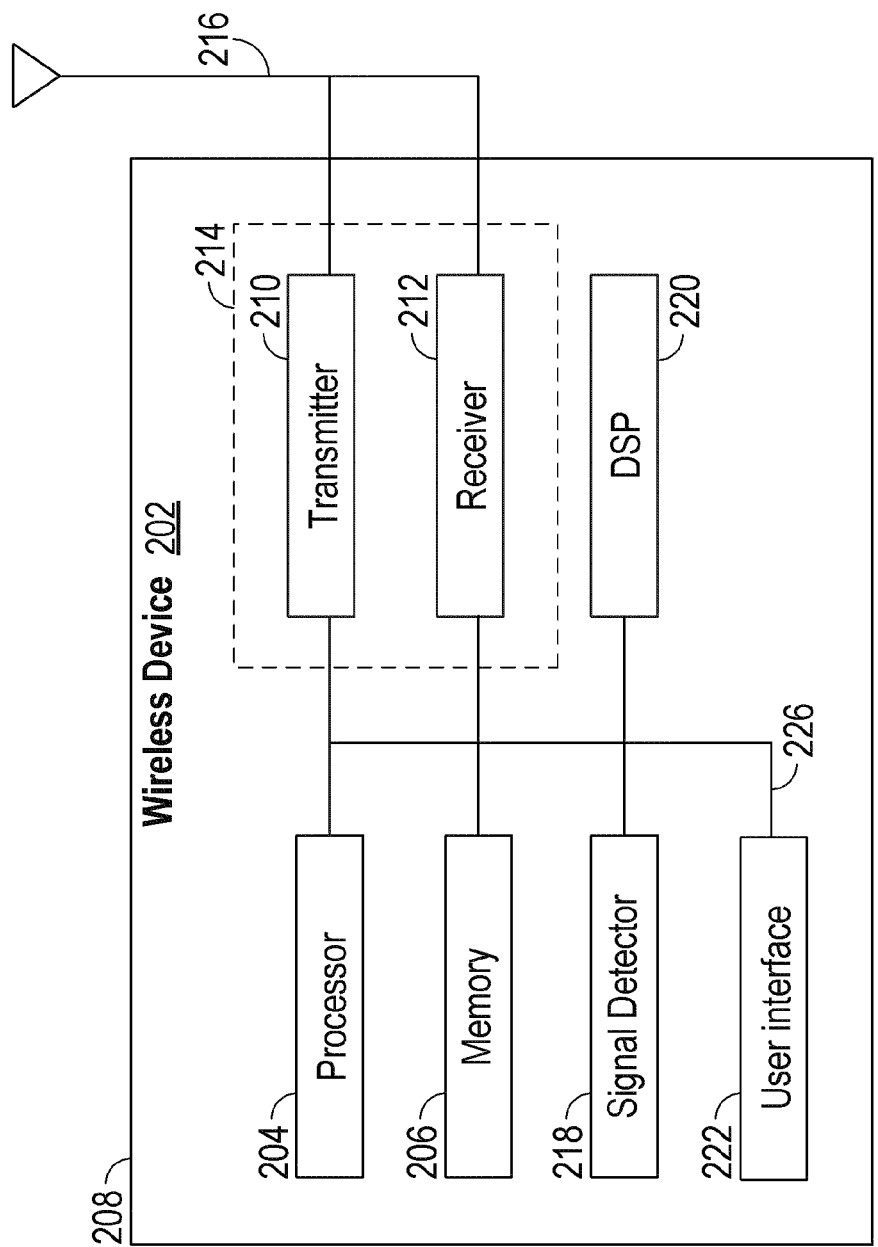
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106 of FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. In addition, the processor 204 may be used to implement any of the components, modules, circuits, or the like described, or each may be implemented using a plurality of separate elements.

Figure 3:
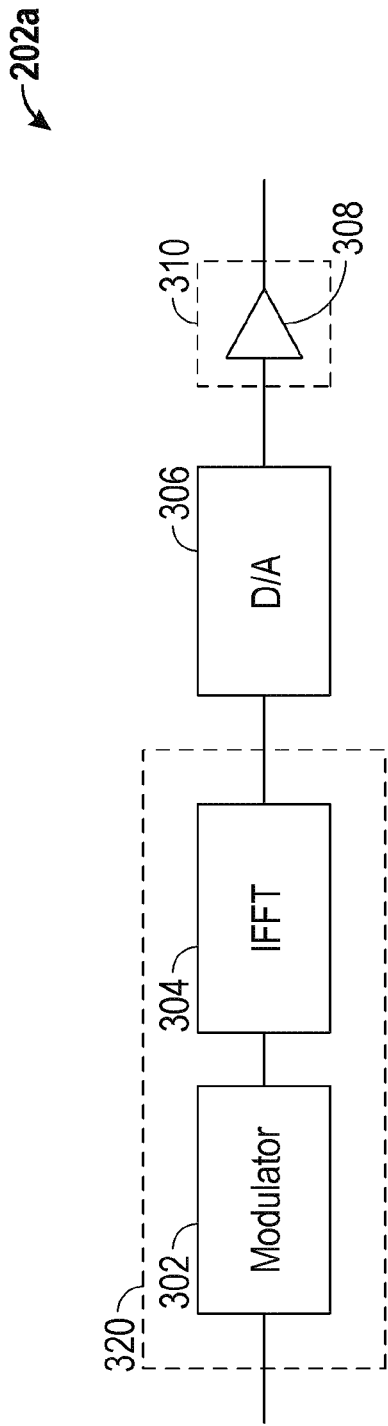
FIG. 3 illustrates various components that may be utilized in the wireless device of FIG. 2 to transmit wireless communications.

As discussed above, the wireless device 202 may comprise an AP 104 or an STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to transmit data units that are temporally long and/or that include one or more training fields interposed between a plurality of data symbols, as will be discussed in additional detail below.

The wireless device 202a of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202 (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

In some aspects, the DSP 320 is configured to insert one or more training fields between a plurality of data symbols. The DSP 320 may determine a position or location of the one or more training fields in the data unit based on information received from the processor 204 (FIG. 2), and/or stored in the memory 206 (FIG. 2) or in a portion of the DSP 320. Inserting the training fields in the data unit will be discussed in additional detail.

Returning to the description of FIG. 3, the wireless device 202a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

In some aspects, the transmitter 310 is configured to transmit the data units over a bandwidth of approximately 2.5 MHz or 1.25 MHz, or lower. When using such bandwidths, transmission of the data unit may be performed over a relatively lengthy period of time. For example, a data unit composed of 500 bytes may be transmitted over a period of approximately 11 milliseconds. Such transmission is approximately sixteen times slower than comparable transmissions implemented pursuant to the 802.11ac standard over bandwidths of approximately 20 MHz.

Figure 4:
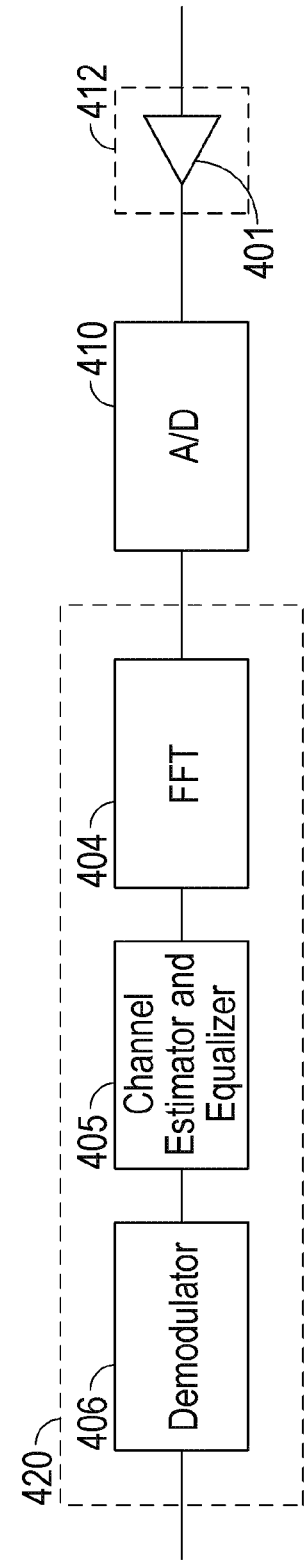
FIG. 4 illustrates various components that may be utilized in the wireless device of FIG. 2 to receive wireless communications.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units that are temporally long and/or that include one or more training fields interposed between a plurality of data symbols, as will be discussed in additional detail below. For example, the components illustrated in FIG. 4 may be used to receive data units transmitted by the components discussed above with respect to FIG. 3.

The receiver 412 of wireless device 202*b* is configured to receive one or more packets or data units in a wireless signal. Data units that may be received and decoded or otherwise processed as discussed below.

In some aspects, the receiver 412 is configured to receive the data units over a bandwidth of approximately 2.5 MHz or 1.25 MHz, or lower. When using such bandwidths, reception of the data unit may be performed over a relatively lengthy period of time, for example approximately 11 milliseconds when the data unit is composed of 500 bytes. During this time, the channel over which the data unit is received may be changing. For example, conditions of the channel may change due to movement of the wireless device 202*b* or of a device transmitting the data unit, or due to weather or other environmental conditions such as the introduction of various obstacles. In such circumstances, information near the end of the data unit may not be correctly decoded if the wireless device 202*b* uses settings determined when reception of the data unit began. As described in additional detail below, however, the wireless device 202*b* may use the training fields interposed between the plurality of data symbols to form an updated estimate of the channel in order to properly decode one or more of the data symbols.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF), for example, to adjust the gain. Those having ordinary skill in the art will understand methods for performing AGC. In some aspects, the amplifier 401 comprises an LNA.

The wireless device 202*b* may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 or in another element of the wireless device 202 (FIG. 2). In some aspects, the analog to digital converter 410 is implemented in a transceiver or in a data receive processor.

The wireless device 202*b* may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses.

The wireless device 202*b* may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning or the middle of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or updated channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202*b* may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 or in another element of the wireless device 202.

As discussed above, the wireless signal received at the receiver 412 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. Further, the systems, methods, and devices herein may utilize data units with midambles. The midambles may include training fields and may be interposed between data symbols in the payload.

The wireless device 202a shown in FIG. 3 shows an example of a single transmit chain to be transmitted over an antenna. The wireless device 202b shown in FIG. 4 shows an example of a single receive chain to be received over an antenna. In some implementations, the wireless devices 202a and 202b may implement a portion of a MIMO system using multiple antennas to simultaneously transmit data.

Figure 5:
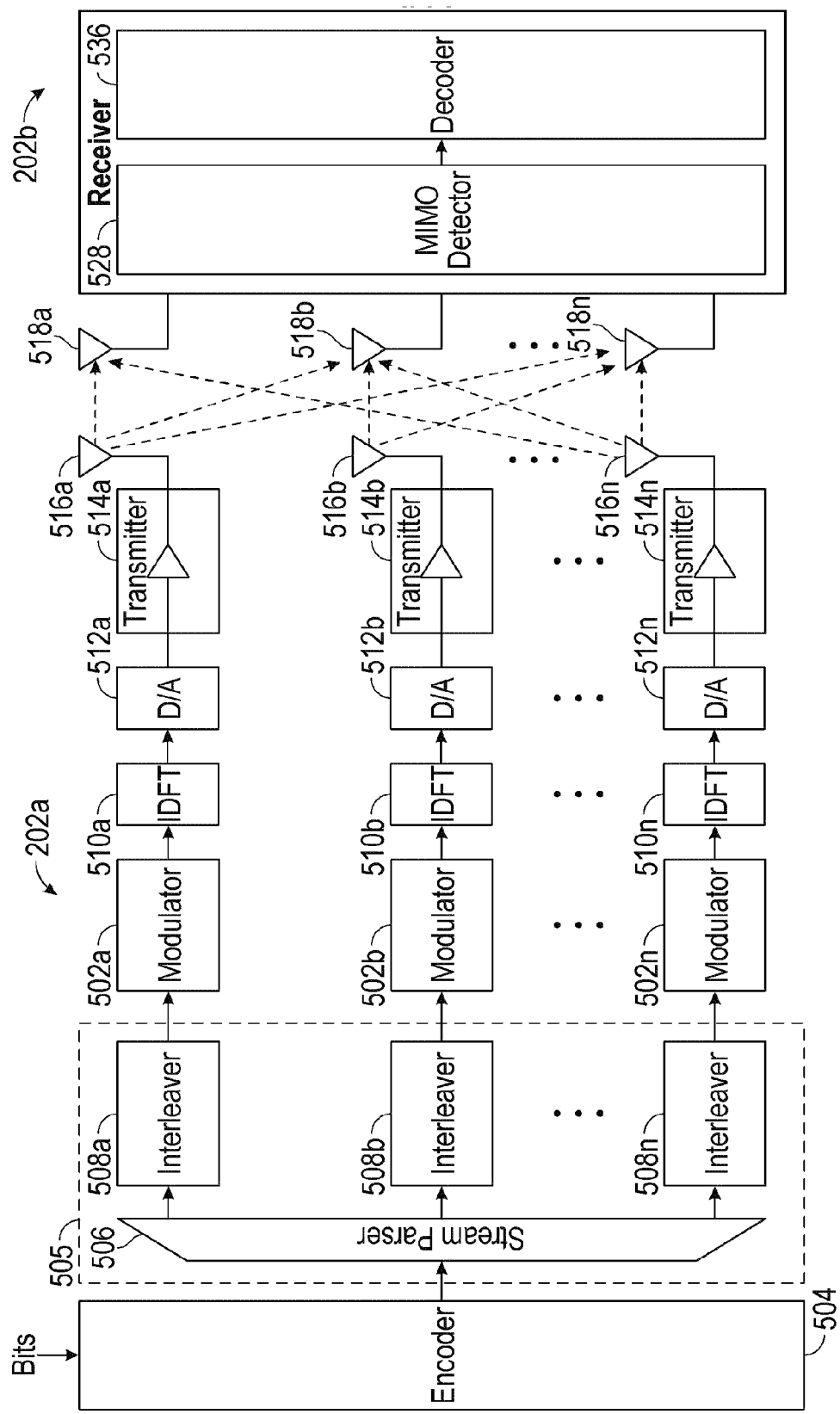
FIG. 5 is a functional block diagram of an exemplary MIMO system that may be implemented in wireless devices such as the wireless device of FIG. 2 to transmit wireless communications.

FIG. 5 is a functional block diagram of a MIMO system that may be implemented in wireless devices such as the wireless device 202 of FIG. 2 to transmit and receive wireless communications. The MIMO system may make use of some or all of the components described with reference to FIG. 3. Bits for transmission that are to be received at an output of the receiver are provided to an encoder 504. The encoder 504 may apply a forward error correcting (FEC) code on the bit stream. The FEC code may be a block code, a convolutional code, or the like. The encoded bits are provided to an interleaving system 505 that distributes the encoded bits into N transmit streams.

The interleaving system 505 includes a stream parser 506 that parses an input bit stream from the encoder 504 to N spatial stream interleavers 508a, 508b, and 508n. The stream parser 506 may be provided with the number of spatial streams and parse bits on a round-robin basis. Other parsing functions may also be used. One parsing function that may be used is $k_n = N_{TX} * k + n$ (i.e., round-robin with one bit per spatial stream, then on to the next spatial stream where $k_n$ is the input bit index and $N_{TX}$ is the number of transmitters/spatial streams). Another more general function f(k,n) may also be used, for example, sending two bits to a spatial stream, then moving on to the next spatial stream. Each interleaver 508a, 508b, and 508n may each thereafter distribute bits so that errors may be recovered due to fading or other channel conditions. Hereinafter the interleavers 508a, 508b, and 508n may be referred to an interleaver 508.

Each transmit stream may then be modulated by a modulator 502a, 502b, or 502n. As described above with reference to FIG. 3, the bits may be modulated using modulation techniques such as QPSK (Quaternary Phase Shift Keying) modulation, BPSK (mapping one bit at a time), 16-QAM (mapping group of six bits), 64-QAM, and the like. The modulated bits for each stream may be provided to transform modules 510a, 510b, and 510n. In some implementations, the transform modules 510a, 510b, and 510n may perform an inverse discrete time fourier transform (IDFT) to convert the modulated bits from a frequency domain into a time domain. The transform modules 510a, 510b, and 510n may operate according to different modes as described above with reference to FIG. 3. For example, the transform modules 510a, 510b, and 510n may be configured to operate according to a 32 point mode or a 64 point mode. In some implementations, the modulated bits may be encoded using space time block coding (STBC) and spatial mapping may be performed before being provided to transform modules 510a, 510b, and 510n. After the modulated bits have been converted into time domain signals for each spatial stream, the time domain signal may be converted into an analog signal via converters 512a, 512b, and 512n as described above with reference to FIG. 3. The signals may then be transmitted using transmitters 514a, 514b, and 514c and using antennas 516a, 516b, or 516n, into a wireless radio space over a desired frequency bandwidth (e.g., 1 MHz, 2 MHz, 4 MHz, 8 MHz, and 16 MHz, or higher).

In some embodiments, antennas 516a, 516b, and 516n are distinct and spatially separated antennas. In other embodiments, distinct signals may be combined into different polarizations off of fewer than N antennas. An example of this is where spatial rotation or spatial spreading is done and multiple spatial streams are mapped on a single antenna. Further, it should be understood that distinct spatial streams can be organized in different manners. For example, a transmit antenna may carry data from more than one spatial stream or several transmit antennas may carry data from a spatial stream. For example, consider the case of a transmitter with four transmit antennas and two spatial streams. Each spatial stream can be mapped onto two transmit antennas, so two antennas are carrying data from just one spatial stream.

Figure 6:
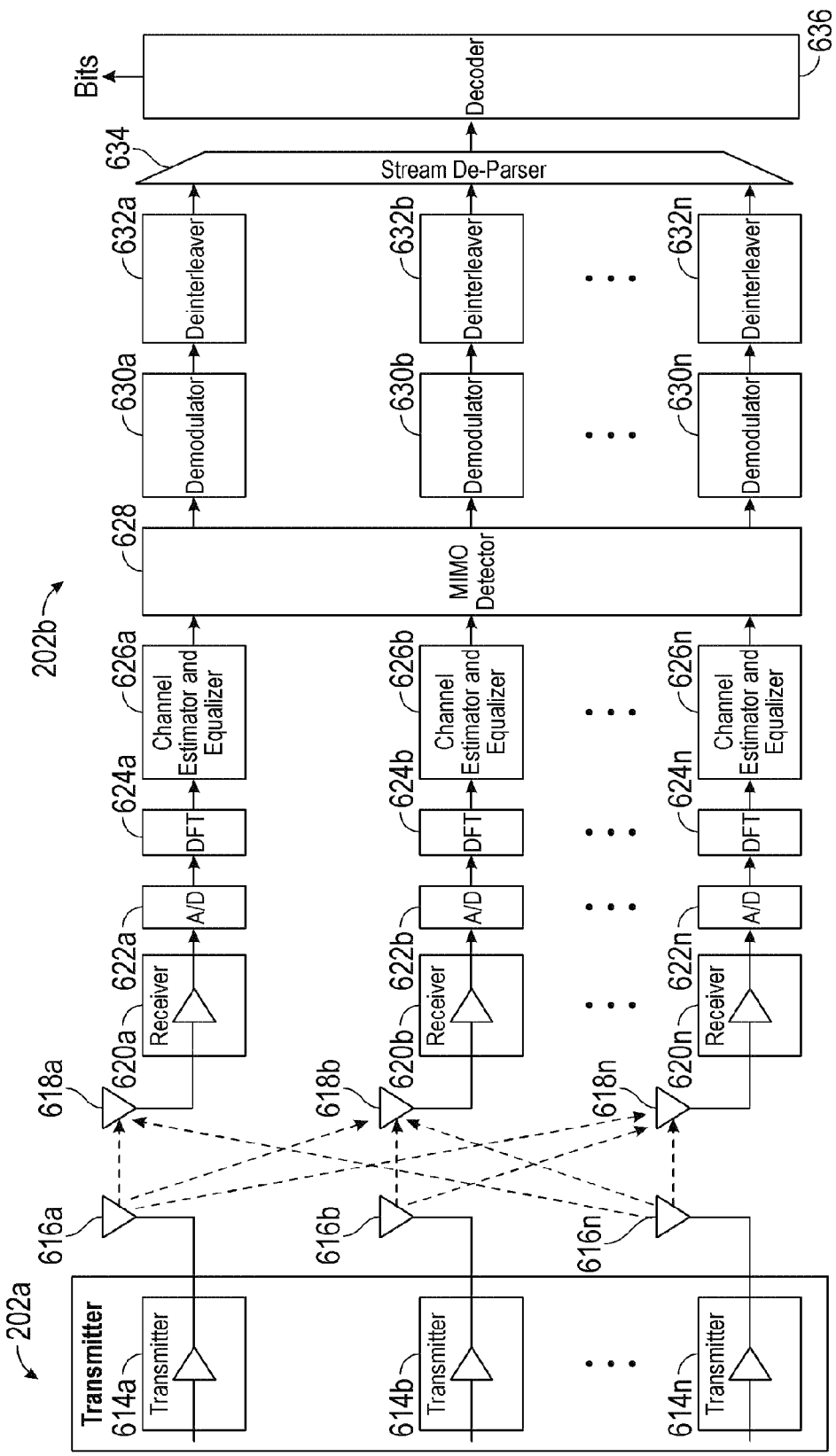
FIG. 6 is a functional block diagram of an exemplary MIMO system that may be implemented in wireless devices such as the wireless device of FIG. 2 to receive wireless communications.

FIG. 6 is a functional block diagram of an exemplary MIMO system that may be implemented in wireless devices such as the wireless device 202 of FIG. 2 to receive wireless communications. The MIMO system may make use of some or all of the components described with reference to FIG. 4. The wireless device 202b may be configured to receive transmissions from the antennas 516a, 516b, and 516n of FIG. 5. A wireless device 202b receives signals from the channel at N antennas 518a, 518b, and 518n or 618a, 618b, and 618n (counting separate polarizations, as appropriate) coupled to N receive circuits. The signals are then provided to receivers 620a, 620b, and 620n that each may include an amplifier configured to amplify the received signals. The signals may then be converted into a digital form via converters 622a, 622b, and 622n.

Converted signals may then be converted into a frequency spectrum via transform modules 624a, 624b, and 624n. As described above, the transform modules 624a, 624b, and 624n may operate according to various modes and according to the size and bandwidth used (e.g., 32 point 64 point, etc.). The transformed signals may be provided to respective channel estimator and equalizer blocks 626a, 626b, and 626n that may function similarly as described above with reference to FIG. 4. After channel estimation, the outputs may be provided to a MIMO detector 628 (e.g., corresponding to MIMO detector 528 of FIG. 5) which may thereafter provide its output to demodulators 630a, 630b, and 630n which may demodulate the bits according to one of the modulation techniques as described above. Demodulated bits may then be provided to deinterleavers 632a, 632b, and 632n which may pass bits into a stream de-parser 634 which may provide the bits into a single bit stream into a decoder 636 (e.g., corresponding to decoder 536 of FIG. 5) that may decode the bits into an appropriate data stream.

As described above, data units exchanged by the AP 104 and the STA 106 may include control information or data in the form of physical (PHY) layer packets or physical layer protocol data units (PPDUs).

Figure 7:
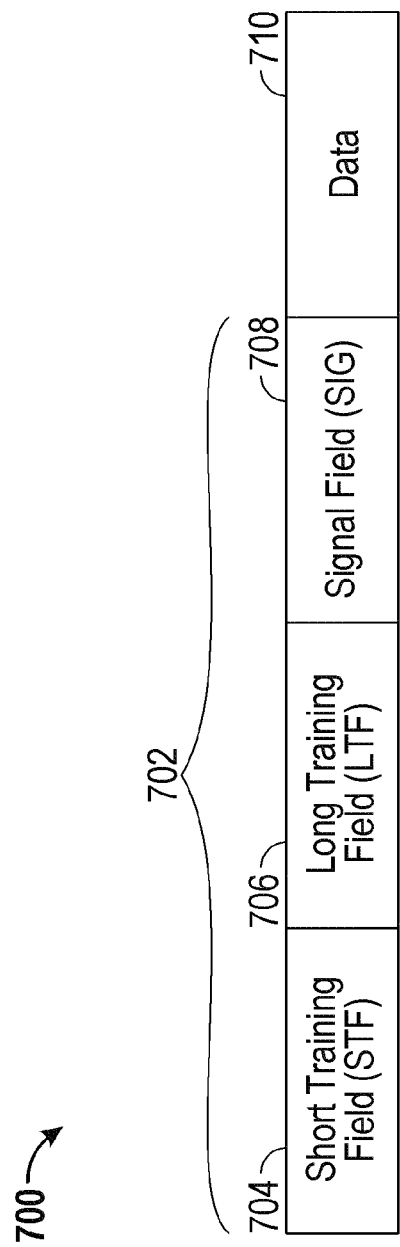
FIG. 7 is a block diagram showing an exemplary structure of a preamble and payload of a physical layer packet.

FIG. 7 is a block diagram showing an example structure of a preamble 702 and payload 710 of a physical layer packet 700. The preamble 702 may include a short training field (STF) 704 that includes an STF sequence of known values. In some aspects, the STF may be used for packet detection (e.g., to detect the start of a packet) coarse time/frequency estimation, and automatic gain control setting. The STF sequence may be optimized to have a low PAPR and include a subset of non-zero tones with a particular periodicity. The STF 704 may span one or multiple OFDM symbols. In some aspects, the preamble 702 may include a long training field (LTF) 706 that may span one or multiple OFDM symbols and may include one or more LTF sequences of known non-zero values. The LTF may be used for channel estimation, signal-to-noise estimation, fine time/frequency estimation, and mode detection. Further, in some aspects, the preamble 702 may include a signal field (SIG) 708 as described above that may include a number of bits or values used in one aspect for mode detection purposes and determination of transmission parameters.

Certain implementations described herein may be directed to wireless communication systems that may be used for smart metering or in a smart grid network. These wireless communication systems may be used to provide sensor applications or in home automation. Wireless devices used in such systems may instead or in addition be used in a healthcare context, for example, for personal healthcare. They may also be used for surveillance, to enable extended-range Internet connectivity (e.g., for use with hotspots), or to implement machine-to-machine communications. Accordingly, some implementations may use low data rates such as approximately 150 Kbps. Implementations may further have increased link budget gains (e.g., around 20 dB) over other wireless communications such as 802.11b. In accordance with low data rates, if wireless nodes are configured for use in a home environment, certain aspects may be directed to implementations with good in-home coverage without power amplification. Furthermore, certain aspects may be directed to single-hop networking without using a MESH protocol. In addition, certain implementations may result in significant outdoor coverage improvement with power amplification over other wireless protocols. Furthermore, certain aspects may be directed to implementations that may accommodate large outdoor delay-spread and reduced sensitivity to Doppler. Certain implementations may achieve similar LO accuracy as traditional WiFi.

Accordingly, certain implementations are directed to transmitting and receiving wireless signals in sub-gigahertz bands. In one aspect, this may result in a propagation gain of, for example, 8.5 dB (e.g., available due to 900 MHz vs. 2.4 GHz). In another aspect, obstruction loss may be reduced by using sub-gigahertz signal which may result in, for example, a 3 dB gain.

Certain implementations are further directed to sending wireless signals with low bandwidths in sub-gigahertz bands. This may further allow achieving greater link budget gains over other wireless communication systems. For example, in one implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width.

Each mode may use a different number of tones/subcarriers for transmitting the information. For example, in one implementation, a 1 MHz mode (corresponding to transmitting or receiving symbols using a bandwidth of 1 MHz) may use 32 tones. In one aspect, using a 1 MHz mode may provide for a 13 dB noise reduction as compared to a bandwidth such as 20 MHz. In addition, low rate techniques may be used to overcome effects such as frequency diversity losses due to a lower bandwidth which could result in 4-5 dB losses depending on channel conditions. To generate/evaluate symbols sent or received using 32 tones, a transform module 304 or 404 as described in FIGS. 3 and 4 may be configured to use a 32 point mode (e.g., a 32 point IFFT or FFT). The 32 tones may be allocated as data tones, pilot tones, guard tones, and a DC tone. In one implementation, 24 tones may be allocated as data tones, 2 tones may be allocated as pilot tones, five tones may be allocated as guard tones, and 1 tone may be reserved for the DC tone. In this implementation, the symbol duration may be configured to be 40 μs including cyclic prefix.

For example, a wireless device 202a of FIG. 3 may be configured to generate a packet for transmission via a wireless signal using a bandwidth of 1 MHz. In one aspect, the bandwidth may be approximately 1 MHz where approximately 1 MHz may be within a range of 0.8 MHz to 1.2 MHz. The packet may be formed of one or more OFDM symbols having 32 tones allocated as described using a DSP 320 (FIG. 3). A transform module 304 (FIG. 3) in a transmit chain may be configured as an IFFT module operating according to a thirty-two point mode to convert the packet into a time domain signal. A transmitter 310 (FIG. 3) may then be configured to transmit the packet.

Likewise, a wireless device 202b of FIG. 4 may be configured to receive the packet over a bandwidth of 1 MHz. In one aspect, the bandwidth may be approximately 1 MHz where approximately 1 MHz may be within a range of 0.8 MHz to 1.2 MHz. The wireless device 202b may include a DSP 420 (FIG. 4) including a transform module 404 (FIG. 4) in a receive chain that may be configured as an FFT module operating according to a thirty-two point mode to transform the time domain signal into a frequency spectrum. A DSP 420 may be configured to evaluate the packet. The 1 MHz mode may support a modulation and coding scheme (MCS) for both a low data rate and a "normal" rate. According to some implementations, the preamble 702 may be designed for a low rate mode that offers reliable detection and improved channel estimation as will be further described below. Each mode may be configured to use a corresponding preamble configured to optimize transmissions for the mode and desired characteristics.

In addition to a 1 MHz mode, a 2 MHz mode may additionally be available that may be used to transmit and receive symbols using 64 tones. In one implementation, the 64 tones may be allocated as 52 data tones, 4 pilot tones, 1 DC tone, and 7 guard tones. As such, a transform module 304 or 404 of FIGS. 3 and 4 may be configured to operate according to a 64 point mode when transmitting or receiving 2 MHz symbols. The symbol duration may also be 40 μs including cyclic prefix. Additional modes with different bandwidths (e.g., 4 MHz, 8 MHz, and 16 MHz) may be provided that may use transform modules 304 or 404 operating in modes of corresponding different sizes (e.g., 128 point FFT, 256 point FFT, 512 point FFT, etc.). In addition, each of the modes described above may be configured additionally according to both a single user mode and a multi user mode. Wireless signals using bandwidths less than or equal to 2 MHz may provide various advantages for providing wireless nodes that are configured to meet global regulatory constraints over a broad range of bandwidth, power, and channel limitations.

In some aspects, the wireless device 202 of FIG. 2 is configured to operate according to several wireless standards, for example, according to one of the 802.11 standards. In this configuration, the wireless device 202 may have a mode for operating in a 20 MHz channel width in the 2.4 GHz or 5 GHz band, as well as a mode for operating in a 40 MHz channel width in the 2.4 GHz band. In another aspect, the wireless device 202 is configured to operate pursuant to the 802.11ac standard. In this configuration, the wireless device 202 has a mode for operating in each of a 20 MHz, 40 MHz, and 80 MHz channel width. Generally, the transform module 304 or 404 may use 64 tones when the wireless device 202 is operating in the 20 MHz band, may use 128 tones when the wireless device 202 is operating in the 40 MHz band, and may use 256 tones when the wireless device 202 is operating in the 80 MHz band.

In some aspects, a controller (e.g., such as processor 204 or DSP 220 of FIG. 2) is configured to adjust operation of the wireless device 202 of FIG. 2 so as to operate in a sub-gigahertz band as described above. In one implementation, to operate according to a mode such as 1 MHz, 2 MHz, 4 MHz, etc. as described above, a controller may be configured to downclock one or more of the components in the wireless device 202 such that the wireless device 202 will operate in a 1 MHz, 2 MHz, 4 MHz, 8 MHz, or 16 MHz. In addition, the processor 204 may be configured to downclock operation of one or more of the components in the wireless device 202 such that the wireless device 202 will operate in modes corresponding to using bandwidths of 5 MHz, 2.5 MHz, 1.25 MHz, and/or 0.625 MHz channel width. During such downclocked operation, the number of tones used by the transform module 304 or 404 may remain the same in some aspects.

Downclocking operation of the wireless device 202 may comprise operating one or more of the components illustrated in FIG. 2 at a reduced clock rate. For example, the downclocking may comprise operating the processor 204, the signal detector 218, the DSP 220, and/or any other digital signal circuitry at a lower rate, for example by adjusting, modifying, or assigning the timing settings of one or more of these components. In some aspects, the downclocked operation is performed in response to a command from the processor 204. In some aspects, the processor 204 provides a clock signal which is reduced in comparison to a clock signal used when operating in the 20 MHz, 40 MHz, or 80 MHz channel width.

In some aspects, the processor 204 is configured to cause the operation of the wireless device 202 of FIG. 2 to be downclocked by a factor of 10 (e.g., by 10×). In such configuration, operation in the 20 MHz channel width will be downclocked to operation in a 2 MHz channel width, and operation in the 40 MHz channel width will be downclocked to operation in a 4 MHz channel width. Furthermore, operation in the 80 MHz channel width will be downclocked to operation in an 8 MHz channel width, and operation in the 160 MHz channel width will be downclocked to operation in a 16 MHz channel width.

Similarly as described above, in one aspect, when a 1 MHz bandwidth for transmission or reception of OFDM symbols is used, a 32 point transform module 304 or 404 may be used. In this case, tones may be allocated as 24 data tones, 2 pilot tones, 5 guard tones, and a DC tone. In another aspect, when a 2 MHz bandwidth for transmission or reception of OFDM symbols is used, a 64 point transform module 304 or 404 may be used. In this case, tones may be allocated as 52 data tones, 4 pilot tones, 7 guard tones, and a DC tone. In yet another aspect, when a 4 MHz bandwidth for transmission or reception of OFDM symbols is used, a 64 point transform module 304 or 404 of FIGS. 3 and 4 may be used. In this case tones may be allocated as 108 data tones, 6 pilot tones, 11 guard tones, and three DC tones. In yet a further aspect, when a 8 MHz bandwidth for transmission or reception of OFDM symbols is used, a 256 point transform module 304 or 404 may be used. In this case tones may be allocated as 234 data tones, 8 pilot tones, 11 guard tones, and three DC tones. Accordingly, the spacing between tones for these bandwidths may be 31.25 KHz. In addition, the symbol duration may be 40 μs including a cyclic prefix of either 4 μs (for short cyclic prefixes) or 8 μs (for long cyclic prefixes). A longer cyclic prefix may be used to accommodate outdoor delay spreads. Furthermore, large symbol durations may be needed to keep cyclic prefix overhead manageable.

In some aspects, the amount by which operation of the wireless device 202 of FIG. 2 is downclocked is predetermined. For example, the downclocking factor may be stored in the memory 206, and loaded at startup of the wireless device 202. In such configuration, the processor 204 may cause the wireless device 202 to operate in a downclocked mode according to the predetermined or loaded downclocking factor.

In some aspects, the amount by which operation of the wireless device 202 of FIG. 2 is downclocked at any given time may be determined in situ. For example, the signal detector 218 may determine a downclocking factor from a beacon or pilot received by the receiver 212. In some aspects, this factor is determined at startup of the device, or when connecting to the network for the first time. In some aspects, a new factor is determined during handoff of the wireless device 202 or each time the wireless device 202 connects to a new network. In some aspects, a predetermined factor may be modified or updated based on a received signal, such as based on a received beacon or pilot. In this way, the wireless device 202 may operate in different bandwidths pursuant to a location of the device or a network to which the device is connecting, for example. The processor 204 may cause the wireless device 202 to operate in a downclocked mode according to the determined downclocking factor.

In some aspects, the wireless device 202 of FIG. 2 is permanently configured to operate in the downclocked mode. For example, the components of the wireless device 202 may be hardwired or have firmware installed therein that causes the device to always perform downclocked operation. In such aspects, the wireless device 202 may be incapable of communicating in the 20 MHz, 40 MHz, and 80 MHz channel widths. Further, the factor of downclocking may be fixed in such aspects. For example, the components may be manufactured and/or installed so as to implement only the fixed downclocking factor. In other aspects, the wireless device may be operated in any of the 20 MHz, 40 MHz, and 80 MHz channel widths, or may be selectively downclocked by the processor 204 to operate in the 1 MHz, 2 MHz, 4, MHz, 8 MHz, and 16 MHz channel width.

In some implementations, when transmitting in a sub-gigahertz range (e.g., 900 MHz), a repetition mode may be used where repetition coding is implemented. A repetition mode may allow for accurate transmission over long distances without sacrificing too much preamble overhead. In some implementations 2× repetition encoding may be used. For example, repetition encoding may allow for as little as 105 dB of pathloss to provide good in-home coverage. When using a wireless sensor network, without repetition coding, customers may have to install higher-power sensors in difficult to reach places. It may not be practical to sell two types of sensors (sensors for "easy to reach places" versus "difficult to reach places"). Furthermore, high-power sensors may not be able to work with low power batteries (e.g., coin-cell batteries) due to peak current drain. Alternatively, without repetition, multiple APs could be installed. However, choosing location and configuration of the APs could be non-trivial for an average consumer. As such, repetition coding may provide various advantages for certain implementations for low data rate applications such as sensor networks.

As an example, in one aspect BPSK rate ½ (half) coding may be used with 4× repetition yielding 94 Kbps. In another aspect, BPSK rate ½ coding may be used with 2× repetition yielding 188 Kbps. In yet another aspect, BPSK rate ½ coding may be used yielding 375 Kbps. In a further aspect, 64 QAM rate ¾ coding may be used resulting in 3.75 Mbps.

In some implementations, the 1 MHz mode and the 2 MHz mode may be required and configured to be interoperable. Using two required modes may avoid issues where devices could be configured for some regulatory regions but may not work for other regulatory regions and may allow for devices to have more options if regulatory constraints change allowing for less restrictive communications. Higher bandwidths (e.g., 8 MHz) may be used for cellular offload.

With reference to FIG. 7, when transmitting packets in sub-gigahertz bands with bandwidths as described above, the preamble 702 may be designed to have robust mode detection in an early state of the preamble to detect between different modes. The preamble 702 may further be optimized to minimize overhead and provide adequate coexistence of devices transmitting using the 1 MHz mode and devices transmitting using greater than or equal to 2 MHz modes. The preamble 702 may be designed to have robust mode detection in an early state of the preamble to detect between 1 MHz transmissions (32 pt FFT) and 2 MHz transmissions (64 pt FFT). The physical layer packet 700 may be generated for transmission for different data rates to allow in one aspect for transmission of data over greater distances. For example, the physical layer packet 700 may be generated for a low data rate along with another "normal" data rate as described above.

FIG. 8A is a block diagram showing an example structure of a preamble 802a and payload 810a of a physical layer packet 800a for transmission over a bandwidth of substantially 1 MHz according to certain implementations. The physical layer packet 800a may be generated using a transform module 304 (FIG. 3) that is configured according to a 32 point FFT mode for transmitting an OFDM symbol with 32 tones as described above.

The preamble 802a may include a short training field (STF) 804a. The STF 804a may include a sequence of known values with a subset of non-zero values corresponding to a subset of non-zero tones with a particularly chosen periodicity. The periodicity of the non-zero tones may be the same as used for STF sequences used in higher bandwidths such as 2 MHz. In some implementations, the STF field 804a may be boosted, such as by 3 dB for repetition coding. The STF 804a may be sent over four OFDM symbols where each symbol repeats a known STF sequence.

The preamble 802a may include a long training field (LTF) 806a. The LTF 806a may be formed of four OFDM symbols and may include an LTF sequence transmitted in each symbol. The LTF sequences may be formed of known non-zero values corresponding to non-zero tones for all pilot and data tones. In some implementations, the LTF sequences may therefore include 26 non-zero values.

The preamble 802a may include a signaling field (SIG) 808a. In some implementations, the SIG field 808a may be repetition coded or 2× repetition coded. The physical layer packet 800a may further include the payload 810a that may be generated using 24 tones in each OFDM symbol allocated for data. The preamble 802a may be used for generating either a low rate or a normal rate 1 MHz transmission. The preamble 802a may be used according to a single user mode.

As described above, the SIG field 808a for a 1 MHz mode may be two symbols. In one implementation, the entries into the SIG field 808a may correspond to the entries shown in Table 1 below. As such, the SIG field 808a may include 36 bits. The SIG field 808a may be coded at BPSK-rate ½ repetition 2×.

TABLE 1

| Field | Bits | Description |
|---|---|---|
| Space Time Coding Block | 1 | May indicate whether Space Time Block Coding is used |
| Number of Spatial Streams | 2 | |
| Short Guard Interval | 1 | |
| Coding | 2 | $1^{st}$ bit may be coding type (LDPC/BCC) while $2^{nd}$ bit may be for LDPC $N_{sym}$ ambiguity |
| Modulation Coding Scheme (MCS) | 4 | |
| Aggregation Bit | 1 | Signals use of AMPDU |
| Length | 9 | My be in symbols when aggregation is on or in bytes when aggregation is off. An AMPDU may be required for packet sizes greater than 511 bytes |
| Reserved | 6 | May be used for MAC bits |
| CRC | 4 | |
| Tail | 6 | May be needed for BCC but could be less bits |

FIG. 8B is a block diagram showing an example structure of a preamble 802b and payload 810b of a physical layer packet 800b for transmission over a bandwidth of substantially 2 MHz according to a single user mode. The physical layer packet 800b may be generated using a transform module 304 (FIG. 3) that is configured according to a 64 point FFT mode for transmitting an OFDM symbol with 64 tones as described above.

The preamble 802b may include a short training field (STF) 804b. The STF 804b may include a sequence of known values with a subset of non-zero values corresponding to a subset of non-zero tones over 64 tones with a determined periodicity. The periodicity of the non-zero tones may be the same as used for STF sequences used for 1 MHz transmissions. The preamble 802b may further include a long training field (LTF) 806b. The LTF 806b may be formed of two OFDM symbols and may include LTF sequences transmitted in each symbol. The LTF sequences may comprise non-zero values corresponding to non-zero tones for all pilot and data tones. The LTF sequences may therefore include 56 non-zero values in some implementations. The preamble 802b may further include a signaling field (SIG) 808b. The SIG field 808b may be formed from two OFDM symbols. The two OFDM symbols of the SIG field 808b may each be QBPSK rotated. If more than one spatial streams are being used, the preamble 802b may include additional long training fields (LTFs) 816b for each of the additional spatial streams being used (e.g., as the LTF 804b may correspond to the first spatial stream if there are more than one). The physical layer packet 800b may further include the payload 810b that may be generated using 52 tones in each OFDM symbol allocated for data. The preamble 802b may be used according to a single user mode.

FIG. 8C is a block diagram showing an example structure of a preamble 802c and payload 810c of a physical layer packet 800c for transmission over a bandwidth of 2 MHz according to a multi-user mode. As described above with reference to FIG. 8B, the physical layer packet 800c may be generated using a transform module 304 (FIG. 3) that is configured according to a 64 point FFT mode for transmitting an OFDM symbol with 64 tones.

The preamble 802c may include a short training field (STF) 804c. The STF 804c may include a sequence of known values with a subset of non-zero values corresponding to a subset of non-zero tones over 64 tones with a determined periodicity. The periodicity of the non-zero tones may be the same as used for STF sequences used for 1 MHz transmissions. The preamble 802c may further include a long training field (LTF) 806c. The LTF 806c may be formed of two OFDM symbols and may include LTF sequences transmitted in each symbol. The LTF sequences may comprise non-zero values corresponding to non-zero tones for all pilot and data tones. The LTF sequences may therefore include 56 non-zero values according to some implementations. The preamble 802c may further include a signaling field (SIG) 808c. The SIG field 808c may be formed from two OFDM symbols. The first of the two OFDM symbols of the SIG field 808c may be QBPSK rotated. In one aspect, this allows for the receiver to detect whether the packet 800c is multi-user mode packet or a single user mode packet based on whether only one of the SIG field symbols is QBPSK rotated. The preamble 802c may further include a very high throughput short training field (VHT-STF) 814c. The VHT-STF 814c may correspond to a VHT-STF used for IEEE 802.11ac transmissions. The preamble 802c may further include one or more very high throughput long training fields (VHT-LTFs) 816c corresponding to each spatial stream being used. The VHT-LTFs 816c may correspond to VHT-LTFs used for IEEE 802.11ac transmissions. The preamble 802c may further include a very high throughput signal field (VHT-SIG-B) 818c. The VHT-SIG-B 818c may correspond to the VHT-SIG-B used for IEE 802.11ac transmissions. The physical layer packet 800c may further include the payload 810c that may be generated using 52 tones in each OFDM symbol allocated for data. The preamble 802c may be used according to a multi-user mode.

Differentiating between a 32 point mode (i.e., 1 MHz) and a 64 point mode (2 MHz) may be done by using an LTF sequence that is orthogonal in frequency across 32 and 64 tone mode, or by detecting the QBPSK rotation on the 1st SIG symbol.

As described above, a wireless device 202 of FIG. 2 may be configured to generate OFDM symbols for transmission over bandwidths greater than 2 MHz, such as for 4 MHz, 8 MHz, 16 MHz, and 32 MHz. In some implementations, when sending OFDM symbols over bandwidths greater than 2 MHz, the SIG field 808b (FIG. 8B) may be duplicated in every 2 MHz segment of the OFDM symbol and may be used to be able to determine the bandwidth of the symbol. As the OFDM symbol for the SIG field may use 52 tones allocated for data, duplication of the SIG field may leave 7 guard tones (3 and 4 tones on the ends of the symbol) for higher bandwidths (4 MHz, 8 MHz, 16 MHz).

In some cases, it may be desirable to use additional guard tones for the LTF 806b and/or SIG 808b fields (FIG. 8B). For example, it may be desirable for the 4 MHz, 8 MHz, and 16 MHz preamble symbols to correspond to corresponding symbols used for 40 MHz, 80 MHz, and 160 MHz of 802.11ac transmissions. As one example, the LTF 806b may use the VHT-LTFs for 40 MHz, 80 MHz, and 160 MHz 802.11ac transmissions depending on whether the OFDM symbol is for 4 MHz, 8 MHz, and 16 MHz respectively. As the VHT-LTFs for 40 MHz, 80 MHz, and 160 MHz have 11 guard tones (5/6), using these VHT-LTFs may not provide non-zero values for channel estimation for 2 tones at each edge, for example if the SIG 808b field allocated 52 tones for data. Furthermore, there may be stricter filtering requirements for symbols being transmitted using greater bandwidths (4 MHz, 8 MHz, and 16 MHz) if the LTF 806b and SIG 808b are transmitted using 52 data tones (i.e., having less guard tones). Duplicating the LTF 806b used for 2 MHz transmissions may inadequately address these issues as the LTF uses 52 non-zero tones, and thus the same guard tone issue remains. As such, an optimized LTF 806b and SIG 808b may be provided for 2, 4, and 8 MHz transmissions. In one aspect, the fields are chosen so as to be able to re-use 20, 40, and 80 MHz LTF sequences used for IEEE 802.11ac packets.

As such, in one implementation, for the 2 MHz packets shown in FIGS. 8B and 8C, the SIG fields 808b and 808c may be transmitted using a different tone allocation than the rest of the fields of the packets 800b and 800c. For example, The SIG fields 808b and 808c may be transmitted using 48 data tones rather than 52 data tones. This may correspond to the tone allocation used for an L-SIG of 802.11a tone allocation. This SIG field 808b and 808c may then be duplicated for each 2 MHz segment for transmissions over 2 MHz. In another implementation, the STFs 804b and 804c, the LTFs 806b and 806c, and the SIG fields 808b and 808c may be generated for transmission using a different tone allocation than the rest of the fields of the packet. For example the STFs 804b and 804c, the LTFs 806b and 806c, and the SIG fields 808b and 808c may be generated for transmission using 48 tones allocated for data.

As described above, the SIG fields 808b and 808c for a 2 MHz mode may use two symbols transmitting up to 52 bits of data. The entries into the SIG fields 808b and 808c may correspond to the entries shown in Table 2 below. The first 26 bits that are un-shaded may correspond to the first symbol while the last 26 bits that are shaded may correspond to the second symbol. It should be appreciated that while 52 bits of data are shown in the table below, however as described above, in some implementations, the SIG fields 808b and 808c may be sent using 48 data tones and as such the SIG field may correspond to 48 bits. In one corresponding implementation, the number of reserved bits shown in Table 2 below may be reduced so that 48 bits are sent or received.

TABLE 2

| Field | Bits | Description |
|---|---|---|
| Bandwidth | 2 | This may indicate a bandwidth mode (e.g., 2 MHz, 4 MHz, 8 MHz, or 16 MHz) |
| Reserved | 1 | |
| Space Time Block Coding | 1 | Indicates whether Space Time Block Coding is used |
| Nsts/GID/AID | 14 | For Single User (SU) Mode - 2 bits may indicate Nsts, 0-12 bits may indicate partial AID<br>For Multi User (MU) Mode - 8 bits may indicate Nsts, 6 bit GID |
| Reserved | 1 | |
| Short Guard Interval (SGI) | 1 | |
| Coding | 2 | $1^{st}$ bit may indicate a coding type for SU (or for user zero for MU) while $2^{nd}$ bit may be used for LDPC Nsym ambiguity |
| Modulation Coding Scheme (MCS) | 4 | For MU mode, the first 3 bits may indicate coding type for users 1-3 while the last is reserved) |
| Beamformed | 1 | May indicate to the receiver if a beamforming steering matrix is applied to the waveform in a SU mode |
| Aggregation Bit | 1 | Reserved for MU |
| Length | 9 | Length field (in symbols when aggregation is on and in bytes when aggregation is off) May mandate AMPDU for packet sizes >511 bytes and for MU |
| Reserved | 4 | Doppler bit may be indicated here |
| Midamble/Doppler | 1 | |
| CRC | 4 | |
| Tail | 6 | May be needed for BCC |

FIG. 9 illustrates an example of a data unit 900. The data unit 900 may comprise a PPDU for use with the wireless device 202 of FIG. 2. The data unit 900 may be used by legacy devices or devices implementing a legacy standard or downclocked version thereof.

The data unit 900 includes a preamble 910. In FIG. 9, the preamble 910 is illustrated as a legacy preamble including an STF 912, a legacy LTF (L-LTF) 914, and a legacy SIG (L-SIG) field 916. The STF 912 may include a gain control sequence and be used by the receiver 412 (FIG. 4) to perform automatic gain control to adjust the gain of the receive amplifier 401 (FIG. 4). In addition, the STF 912 may be used to perform frequency offset estimation and timing estimation. The L-LTF 914 may include a channel estimation sequence and be used by the channel estimator and equalizer 405 (FIG. 4) to form an estimate of the channel over which the data unit 900 is received. In addition, the L-LTF 914 may be used for signal-to-noise estimation and fine frequency offset estimation and timing estimation. The L-SIG field 916 may indicate a length of the data unit 900 in bytes.

Following the legacy preamble 910 in the data unit 900 is a plurality of data symbols 922. As can be seen in FIG. 9, one or more additional L-LTFs 914 are interposed between certain of the data symbols 922. In the illustrated aspect, an L-LTF 914 is inserted after every n data symbols 922, where n is an integer. For example, the DSP 320 (FIG. 3) may insert the L-LTFs 914 after every n data symbols 922 during generation of the data unit 900. The number of data symbols n may be known by the wireless device 202a (FIG. 3), for example, because n is defined in a communications standard and/or because the wireless device 202a is programmed with n at the time of manufacture. In some aspects, n may be stored in the memory 206 (FIG. 2), and utilized or looked up by the DSP 320 of the wireless device 202a when inserting the additional L-LTFs 914. In some aspects, n is approximately 25. In some aspects, n is selected such that an L-LTF 914 is repeated approximately every 1.6 milliseconds.

When the data unit 900 is received at the wireless device 202b (FIG. 4), the size of the data unit 900 including the training symbols 914 may be computed based on the L-SIG field 916, and the STF 912 is used by the receiver 412 (FIG. 4) to adjust the gain of the receive amplifier 401 (FIG. 4). Further, the initial L-LTF 914a may be used by the channel estimator and equalizer 405 (FIG. 4) to form a first estimate of the channel over which the data unit 900 is received. The first channel estimate may be used by the DSP 420 (FIG. 4) to decode the plurality of data symbols 922 that follow the preamble 910, but precede the L-LTF 914b. For example, the first channel estimate may be used to decode the data symbols 914a and 914b, as well as any other data symbols that precede the L-LTF 914b.

After the n data symbols between the L-LTF 914a and the L-LTF 914b have been decoded, channel estimator and equalizer 405 (FIG. 4) may be used to form a second channel estimate using the L-LTF 914b. The second channel estimate may be used by the DSP 420 (FIG. 4) to decode the plurality of symbols 922 that follow the L-LTF 914b, but precede the L-LTF 914c, for example the data symbols 922c, 922d. This process of forming new or updated channel estimates after n data symbols, and decoding subsequent data symbols using the new or updated channel estimates may be repeated until all of the data symbols 922 have been decoded. In this way, all of the data symbols 922 may be properly decoded, even when the data unit 900 is long and the conditions of the channel are changing.

The value of n may be known at the wireless device 202b (FIG. 4), for example because n is defined in a communications standard and/or because the wireless device 202b is programmed with n at the time of manufacture. In some aspects, n may be communicated to the wireless device 202b when the wireless device 202b first registers with an AP 104 (FIG. 1) or enters a BSA 102 (FIG. 1). In some aspects, n may be stored in the memory 206 (FIG. 2), and utilized or looked up by the DSP 420 (FIG. 4) of the wireless device 202b (FIG. 4) when receiving the data unit 900. The wireless device 202b may calculate the location of the L-LTFs 914 using the known n and the size of the data unit 900 calculated from the L-SIG field 916.

In some aspects, one or more of the data symbols 922 may be stored, for example in the memory 206 (FIG. 2) or in a RAM of the DSP 220 (FIG. 2), and the stored data symbols 922 decoded by the DSP 220 using a channel estimate calculated from a following L-LTF 914. In some aspects, a channel estimate based on the nearest L-LTF 914 to a data symbol is used by the DSP 220 to decode the data symbol. For example, when n is equal to two, the data symbol 922b will be located closer to the L-LTF 914b than to the L-LTF 914a. In this situation, the channel estimate formed from the L-LTF 914b would be used to decode the data symbol 922b.

In some aspects, data symbols may be decoded two or more times by the DSP 220 (FIG. 2). For example, after decoding the data symbol 922b with a channel estimate formed from the L-LTF 914a, the data symbol 922b may again be decoded using a channel estimate calculated from the L-LTF 914b. In some aspects, every data symbol 922 is decoded twice: once using a preceding L-LTF 914 and once using a following L-LTF 914. The results of the two decodings may be checked using a cyclic redundancy check (CRC) at the end of the data unit 900. In other aspects, a data symbol is only decoded twice if it is nearer to the next L-LTF 914 than to the preceding L-LTF 914. In other aspects, a data symbol is only decoded twice if the difference between the channel estimate based on the next L-LTF 914 and the preceding L-LTF 914 is greater than a certain threshold.

In some aspects, the DSP 220 (FIG. 2) may be configured to calculate a channel estimate specification to a certain data symbol using the L-LTF 914 preceding the data symbol and the next L-LTF 914 following the data symbol. For example, the DSP 220 may use interpolation to calculate a channel estimate for the data symbol that is between the channel estimate based on the next L-LTF 914 and the preceding L-LTF 914.

In some aspects, each of the L-LTFs 914a-914e is the same. In other aspects, one or more of the L-LTFs 914a-914e differs from another of the L-LTFs. In some aspects, the L-LTFs 914b-914e, which are interposed between the data symbols 922, are the same, but differ from the initial L-LTF 914a.

The data unit 900 illustrated in FIG. 9 is only an example of a data unit that may be used in the system 100 (FIG. 1) and/or with the wireless device 202 (FIG. 2). In some aspects, a greater or fewer number of the L-LTFs 914 and/or the data symbols 922 may be included in the data unit 900. In addition, one or more symbols or fields may be included in the data unit 900 that are not illustrated in FIG. 9, and one or more of the illustrated fields or symbols may be omitted.

FIG. 10 illustrates an example of a data unit 1000. The data unit 1000 may comprise a PPDU for use with the wireless device 202 of FIG. 2. The data unit 1000 may be used by devices that support very high throughput (VHT) communications. In one aspect, the data unit 1000 is used by devices that implement a downclocked version of the 802.11ac standard.

The data unit 1000 includes the legacy preamble 910 illustrated in FIG. 9, as well as a VHT SIGA field 1002, a VHT STF 1004, and one or more VHT LTFs 1006a, 1006b in a preamble of the data unit 1000. The VHT STF 1004 may include a gain control sequence and be used by the receiver 412 (FIG. 4) to perform automatic gain control to adjust the gain of the receive amplifier 401 (FIG. 4), as discussed above. In addition, the VHT STF 1004 may be used to perform frequency offset estimation and timing estimation. The VHT LTFs 1006a, 1006b may include a channel estimation sequence and be used by the channel estimator and equalizer 405 (FIG. 4) to form an estimate of the channel over which the data unit 1000 is received. In addition, each of the VHT LTFs 1006a, 1006b may be used for signal-to-noise estimation and fine frequency offset estimation and timing estimation. The number of VHT LTFs that are included in the data unit 1000 between the VHT STF 1004 and a VHT SIGB field 1012 may depend on the number of spatial streams being used for communication of the data unit 1000.

In some aspects, the L-SIG field 916 included in the preamble 910 indicates the length of the data unit 1000, including all training symbols inserted between data symbols. In some aspects, the L-SIG field 916 includes information indicating that the data unit comprises the VHT fields 1002-1012. In such aspects, the STF 912 and the L-LTF 914 included in the preamble 910 may be ignored.

Following the VHT LTFs 1006a, 1006b in the preamble of the data unit 1000 is the VHT SIGB field 1012. After the preamble is a plurality of data symbols 1022. As can be seen in FIG. 10, one or more additional VHT LTFs 1006 are interposed between certain of the data symbols 1022. In the illustrated aspect, a set of one or more VHT LTFs 1006 is inserted after every n data symbols 1022, where n is an integer. As with the VHT LTFs 1006a, 1006b, the number of VHT LTFs in each set may depend on the number of spatial streams being used for communication of the data unit 1000.

The DSP 320 (FIG. 3) may insert the VHT LTFs 1006 after every n data symbols 1022 during generation of the data unit 1000. In some aspect, the number of data symbols n may be known by the wireless device 202a (FIG. 3), for example because n is defined in a communications standard and/or because the wireless device 202a is programmed with n at the time of manufacture. In some aspects, n may be stored in the memory 206 (FIG. 2), and utilized or looked up by the DSP 320 of the wireless device 202a when inserting the additional VHT LTFs 1006.

In some aspects, the wireless device 202a (FIG. 3) may determine n based on any number of factors. In one aspect, n may vary depending on which type of modulation coding scheme (MCS) is used to communicate the data unit 1000. For example, when quadrature phase-shift keying (QPSK) is used, the VHT LTFs may be repeated approximately every 4 milliseconds. When a higher rate MCS is used, on the other hand, the VHT LTFs 1006 may be repeated approximately every 1 millisecond. The DSP 320 (FIG. 3) may then compute n based on these timing constraints.

In some aspects, the DSP 220 (FIG. 2) may determine n based on the number of spatial streams used to communicate the data unit 1000. In some aspects, n may be a function of symbol duration and/or a downclocking factor used by the wireless device 202a (FIG. 3) or 202b (FIG. 4). In such aspects, the DSP 220 may determine n using a lookup table or by calculating n using an equation or formula.

In some aspects, n may be based on a known or standardized number of bytes between VHT LTFs 1006. The DSP 220 (FIG. 2) may determine the number of data symbols 622 containing the known or standardized number of bytes to determine n. In such aspects, the DSP 220 may determine n using a lookup table or by calculating n using an equation or formula.

In some aspects, the value of n may vary based on network conditions. For example, the DSP 220 (FIG. 2) may determine n based on a deployment or architecture of a network. As another example, the DSP 220 may determine n based on movement of the wireless device 202a (FIG. 3) and/or the wireless device 202b (FIG. 4). As a further example, the DSP 220 may determine n based on a signal to noise ratio (SNR) of the channel over which the data unit 1000 is being communicated.

Information for determining the value of n may be inserted by the DSP 220 (FIG. 2) into the preamble of the data unit 1000, for example, in the VHT SIGA field 1002. In some aspects, the information is included in one or more reserved bits in the VHT SIGA field 1002. For example, the information may be included at B2 (e.g., Bit 2) and/or B23-24 of a VHT SIGA1 portion of the VHT SIGA field 1002, and/or at B9 of a VHT SIGA2 portion of the VHT SIGA field 1002. In some aspects, the value of n is included in the VHT SIGA field 1002. In other aspects, information that the wireless device 202b (FIG. 4) may use to calculate n is included in the SIGA field 1002. In one aspect, the DSP 320 (FIG. 3) of the wireless device 202a (FIG. 3) includes an indicator in the SIGA field 1002 signifying how many sets of interposed L-LTFs 1006 there are in the data unit 1000. The DSP 420 (FIG. 4) of the wireless device 202b may use this indicator and the length of the data unit 1000 determined from the L-SIG field 916 to determine n.

When the data unit 1000 is received at the wireless device 202b (FIG. 4), the length of the data unit 1000 may be determined based on the L-SIG field 916, and the VHT STF 1004 is used by the receiver 412 (FIG. 4) to adjust the gain of the receive amplifier 401 (FIG. 4). Further, the initial set of VHT LTFs 1006a, 1006b are used by the channel estimator and equalizer 405 (FIG. 4) to form first estimates of the channel over which the data unit 1000 is received. The first channel estimates may be used by the DSP 420 (FIG. 4) to decode the plurality of data symbols 1022 that follow the preamble, but precede the set of VHT LTFs 1006c, 1006d. For example, the first channel estimates may be used to decode the data symbol 1022a, as well as any other data symbols that precede the VHT LTF 1006c.

After the n data symbols between the VHT LTF 1006b and the VHT LTF 1006c have been decoded, channel estimator and equalizer 405 (FIG. 4) may be used to form second channel estimates using the set of VHT LTFs 1006c, 1006d. The second channel estimates may be used by the DSP 420 (FIG. 4) to decode the plurality of data symbols 1022 that follow the VHT LTF 1006d. Similar to how channel estimates formed from the L-LTFs 914 were described as being used to decode data symbols 922 with respect to FIG. 9, a channel estimate formed from a VHT LTF 1006 may only be used to decode data symbols 1022 that follow the VHT LTF 1006, or may be used to decode data symbols that both precede and follow the VHT LTF 1006. In some aspects, an interpolation between channel estimates formed from a preceding VHT LTF 1006 and a following VHT LTF 1006 is used to decode a data symbol 1022.

The process of forming new or updated channel estimates after n data symbols and decoding subsequent data symbols using the new or updated channel estimates, as described above, may be repeated until all of the data symbols 1022 have been decoded. In this way, all of the data symbols 1022 may be properly decoded, even when the data unit 1000 is long and the conditions of the channel are changing.

As discussed above, the value of n may be known at the wireless device 202b (FIG. 4) or may be communicated to the wireless device 202b when the wireless device 202b first registers with an AP 104 (FIG. 1) or enters a BSA 102 (FIG. 1). For example, n may be stored in the memory 206 (FIG. 2), and utilized or looked up by the DSP 420 (FIG. 4) of the wireless device 202b when receiving the data unit 1000. In some aspects, the DSP 420 (FIG. 4) may determine the value of n based on information included in the VHT SIGA field 1002. For example, the MCS used to transmit the data may be included by the wireless device 202a (FIG. 3) in the VHT SIGA field 1002, and the wireless device 202b may determine n based on the MCS indicated by the VHT SIGA field 1002. In such aspects, each potential MCS that may be used may be associated with a standardized value of n. Thus, the wireless device 202b may determine n using a formula or a lookup table, for example as may be stored in the memory 206. In some aspects, the wireless device 202b may calculate the location of the VHT LTFs 1006 using a known n and the size of the data unit 1000 from the L-SIG field 916, or from a number of interposed VHT LTFs 1006 indicated in the VHT SIGA field 1002 and the size. In some aspects, the DSP 220 (FIG. 2) may determine n based on a number or spatial streams over which the data symbols 1022 are received, or may determine n based on a number of data bytes in the data unit 1000. In some aspects, the number of data bytes is indicated in the L-SIG field 916.

In some aspects, each of the VHT LTFs 1006a-1006d is the same. In other aspects, one or more of the VHT LTFs 1006a-1006d differs from another of the VHT LTFs. In some aspects, the VHT LTFs 1006c and 1006d, which are interposed between the data symbols 1022, are the same, but differ from the initial VHT LTFs 1006a, 1006b.

Figure 11:
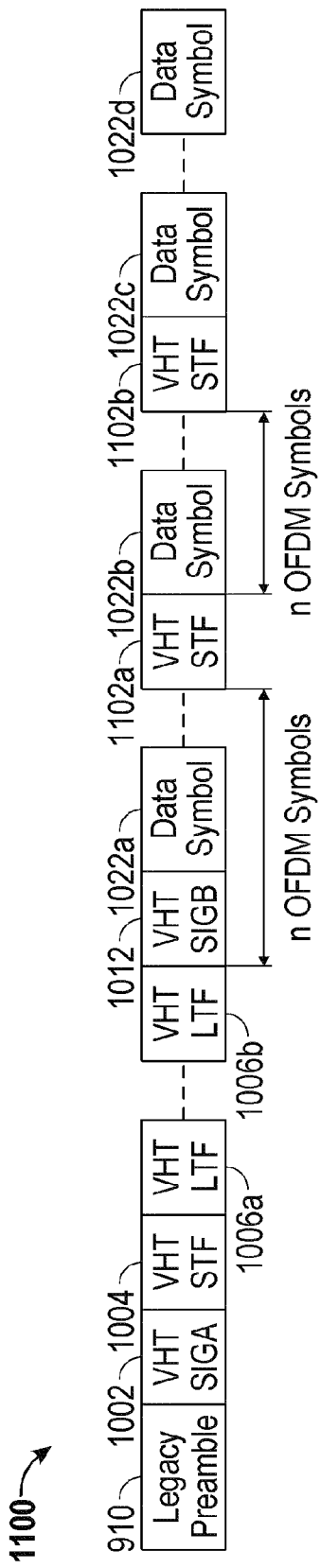
FIG. 11 illustrates an example of a physical layer data unit.

FIG. 11 illustrates an example of a data unit 1100. The data unit 1100 may comprise a PPDU for use with the wireless device 202 of FIG. 2. In one aspect, the data unit 1100 is used by devices that implement a downclocked version of the 802.11ac standard.

The data unit 1100 is configured similar to the data unit 1000 of FIG. 10, except that instead of VHT LTFs 1006 being inserted after every n data symbols 1022, a VHT STF 1102 is inserted after every n data symbols 1022. The value of n may be known or may vary, as described above.

When receiving the data unit 1100, the wireless device 202b (FIG. 4) may perform automatic gain control to adjust the gain of the receive amplifier 401 (FIG. 4) after reception of each of the VHT STFs 1004, 1102. For example, when the data unit 1100 is received at the wireless device 202b, the gain of the amplifier 401 may be set pursuant to the initial VHT STF 1004. The amplifier 401 is then used to receive the data symbol 1022a for decoding, as well as any other data symbols that precede the VHT LTF 1102a. After the n data symbols between the VHT STF 1004 and the VHT STF 1102a have been decoded, the receiver 412 (FIG. 4) may adjust the gain of the amplifier 401 based on the VHT STF 1102a using automatic gain control. The amplifier 401 may then be used to receive the plurality of data symbols 1022 that follow the VHT STF 1102a for decoding.

The process of adjusting the gain of the amplifier 401 (FIG. 4) after n data symbols and thereafter receiving subsequent data symbols using the amplifier 401, as described above, may be repeated until all of the data symbols 1022 have been decoded. In this way, all of the data symbols 1022 may be properly decoded, even when the data unit 1100 is long and the conditions of the channel are changing. The wireless device 202b (FIG. 4) may determine the value of n using any of the means or processes described above with respect to FIG. 10.

In some aspects, each of the VHT STFs 1004, 1102 is the same. In other aspects, one or more of the VHT STFs 1004, 1102 differs from another of the VHT STFs. In some aspects, the VHT STFs 1102, which are interposed between the data symbols 1022, are the same, but differ from the initial VHT STFs 1004. In one aspect, the VHT STF 1004 is transmitted in two symbols, and the VHT STFs 1102 are transmitted in 1 symbol.

In some aspects, interposed L-LTFs 914 in the data unit 900 of FIG. 9 may be replaced by STFs similar to the way in which the sets of interposed VHT LTFs 1006 are replaced by the VHT STFs 1102 in the data unit 1100. Thus, an STF could be repeated after every n data symbols 922 in the data unit 900, and the gain of the amplifier 401 (FIG. 4) could be adjusted using the interposed STFs.

Figure 12:
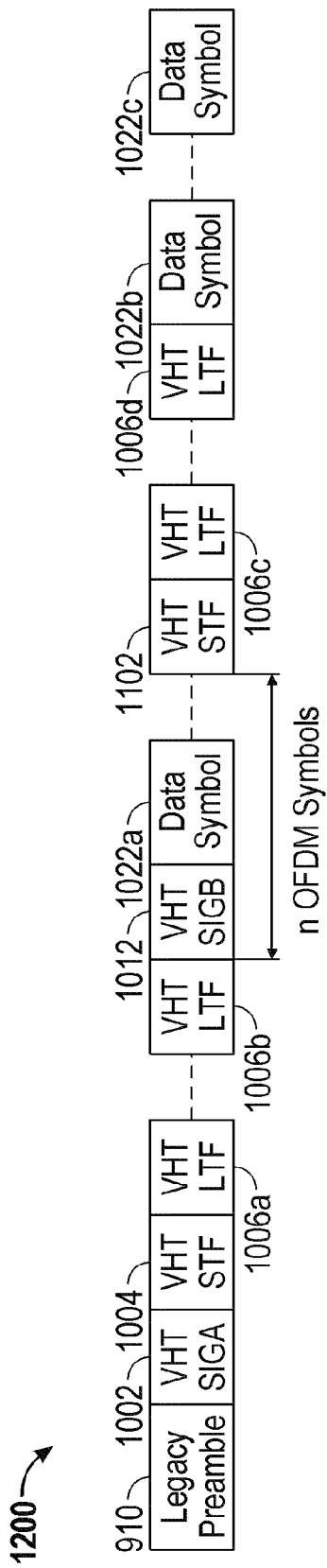
FIG. 12 illustrates an example of a physical layer data unit.

FIG. 12 illustrates an example of a data unit 1200. The data unit 1200 may comprise a PPDU for use with the wireless device 202 of FIG. 2. In one aspect, the data unit 1200 is used by devices that implement a downclocked version of the 802.11ac standard.

The data unit is configured similar to the data unit 1000 of FIG. 10, except that the VHT STF 1102 is disposed adjacent each set of interposed VHT LTFs 1006. In the illustrated embodiment, the VHT STF 1102 immediately precedes each of the interposed sets of VHT LTFs 1006. Each pairing of the VHT STF 1102 and the set of VHT LTFs 1006 is repeated every n data symbols 1022. The value of n may be known or may vary, as described above.

As described above, the wireless device 202b (FIG. 4) may perform automatic gain control to adjust the gain of the receive amplifier 401 (FIG. 4) after reception of each of the VHT STFs 1004, 1102. Further, as also discussed above, the wireless device 202b may form new or updated channel estimates after reception of each set of the VHT LTFs 1006. Thus, the data symbol 1022a may be received using a first gain for the amplifier 401 and decoded by the DSP 420 (FIG. 4) using first channel estimates, while the symbol 1022b may be received using a second gain for the amplifier 401 and decoded by the DSP 420 using second channel estimates. The first gain may be based on the VHT STF 1004 and the first channel estimates may be based on the VHT LTFs 1006a, 1006b, while the second gain may be based on the VHT STF 1102a and the second channel estimates may be based on the VHT LTFs 1006c, 1006d.

In some aspects, the symbol 1022a may be decoded based at least partially on a channel estimate formed from the VHT LTF 1006c or 1006d. In some aspects, a channel estimate formed from a VHT LTF 1006 may only be used to decode data symbols 1022 that follow the VHT LTF 1006, or may be used to decode data symbols that both precede and follow the VHT LTF 1006. In some aspects, an interpolation between channel estimates formed from a preceding VHT LTF 1006 and a following VHT LTF 1006 is used to decode a data symbol 1022.

The process of forming new or updated channel estimates and adjusting the gain of the amplifier 401 (FIG. 4) after n data symbols, receiving subsequent data symbols using the adjusted gain, and decoding the subsequent data symbols using the new or updated channel estimates, as described above, may be repeated until all of the data symbols 1022 have been decoded. In this way, all of the data symbols 1022 may be properly decoded, even when the data unit 1200 is long and the conditions of the channel are changing.

FIG. 13 illustrates an example of a data unit 1300. The data unit 1300 may comprise a PPDU for use with the wireless device 202 of FIG. 2. In one aspect, the data unit 1300 is used by devices that implement a downclocked version of the 802.11ac standard.

The data unit 1300 is configured similar to the data unit 1100 of FIG. 11, except that instead of inserting the VHT STF 1102 every n data symbols, the VHT STF 1102 is inserted every m data symbols. In the illustrated embodiment, m is an integer multiple of n. Thus, after every m/n sets of the VHT LTFs 1006, the VHT STF 1102 will be inserted in the data unit 1300 adjacent a set of the VHT LTFs 1006. In the illustrated aspect, each VHT STF 1102 immediately precedes a set of the VHT LTFs 1006.

In some aspects, n may instead be an integer multiple of m. Thus, a plurality of the VHT STFs 1102 may be repeated in the data unit 1300 prior to a set of the VHT LTFs 1006 being inserted. As discussed above, new or updated channel estimates may be formed after every n data symbols 1022 using the sets of VHT LTFs 1006, and data symbols 1022 decoded using the new or updated channel estimates. Similarly, a gain of the amplifier 401 (FIG. 4) may be adjusted every m data symbols, and subsequent data symbols 1022 received using the adjusted gain.

The value of m may be known or predetermined in any of the ways that n may be known or predetermined. Similarly, the value of m may vary, for example in any of the ways that n may vary. The value of m may be determined by the wireless device 202a (FIG. 3) similar to any of the ways that the value of n is determined, and the value of m may be conveyed to the wireless device 202b (FIG. 4) and/or determined by the wireless device 202b in any of the ways that n is conveyed or determined. For example, the value of m may be indicated in the VHT SIGA field 1002, or information for calculating m may be included in the VHT SIGA field 1002. In some aspects, an indicator is included in the VHT SIGA field 1002 that indicates whether VHT STFs 1102 are interposed, whether VHT LTFs 1006 are interposed, or whether both VHT STFs 1102 and VHT LTFs 1006 are interposed. Thus, the type of training field that is interposed between the data symbols 1022 in the data unit may be indicated in the VHT SIGA field 1002.

In some aspects, STFs may be interposed in the data unit 900 of FIG. 9 similar to the way in which the VHT STFs 1102 are interposed in the data unit 1200 or 1300 of FIGS. 12 and 13, respectively. Thus, an STF could be repeated adjacent each L-LTF 914 after every n data symbols 922 in the data unit 900, or an STF could be repeated after every m data symbols 922 in the data unit 900. The gain of the amplifier 401 (FIG. 4) may be adjusted using the interposed STFs.

FIG. 14 illustrates an example of a data unit 1400. The data unit 1400 may comprise a PPDU for use with the wireless device 202 of FIG. 2. In one aspect, the data unit 1400 is used by devices that implement a downclocked version of the 802.11ac standard.

The data unit 1400 includes the legacy preamble 910, the VHT SIGA field 1002, the initial VHT STF 1004, the initial set of VHT LTFs 1006a, 1006b, the VHT SIGB field 1012, and the plurality of data symbols 1022. In contrast to some of the other data units discussed above where the VHT STF 1102 and/or the sets of VHT LTFs 1006 are periodically inserted after every n and/or m symbols, the VHT STF 1102 and/or the sets of VHT LTFs 1006 may be inserted in the data unit 1400 at varying or irregular intervals.

For example, the VHT SIGA field 1002 may include information pointing to or indicating where the next VHT STF 1102 and/or set of VHT LTFs 1006 will be. For example, the VHT SIGA field 1002 may indicate the value of n. Adjacent the next VHT STF 1102 and/or set of VHT LTFs 1006, however, another SIG (N-SIG) field 1402 is inserted. The N-SIG field 1402 includes information pointing to or indicating where the next VHT STF 1102 and/or set of VHT LTFs 1006 will be. The next VHT STF 1102 and/or set of VHT LTFs 1006 may be n data symbols away, or may be some other number x data symbols away. In this way, the number of data symbols between any two VHT STFs 1102 and/or sets of VHT LTFs 1006 may be varied.

In some aspects, the wireless device 202b (FIG. 4) varies the distance between VHT STFs 1102 and/or sets of VHT LTFs 1006 based on channel conditions. For example, if the channel is changing slowly or if the SNR of the channel is low, the distance between VHT STFs 1102 and/or sets of VHT LTFs 1006 may be increased. If the channel is rapidly changing, however, or the SNR of the channel is high, the distance between VHT STFs 1102 and/or sets of VHT LTFs 1006 may be decreased.

As discussed above, new or updated channel estimates may be formed using the sets of VHT LTFs 1006, and data symbols 1022 decoded using the new or updated channel estimates. Similarly, a gain of the amplifier 401 (FIG. 4) may be adjusted every after receipt of each of the VHT STFs 1102, and subsequent data symbols 1022 received using the adjusted gain.

In some aspects, either the VHT STF 1102 or the interposed sets of VHT LTFs 1006 may be omitted from the data unit 1400. Thus, in some aspects, the data unit 1400 includes only the N-SIG fields 1402 and the VHT STFs 1102 interposed between the data symbols 1022. In other aspects, the data unit 1400 includes only the N-SIG fields 1402 and the sets of VHT LTFs 1006 interposed between the data symbols 1022.

The data units 1000-1400 illustrated in FIGS. 10-14 are only examples of data units that may be used in the system 100 (FIG. 1) and/or with the wireless device 202 (FIG. 2). In some aspects, a greater or fewer number of the SIG fields, VHT STFs, VHT LTFs, and/or the data symbols may be included in any of the data units 1000-1400. In addition, one or more symbols or fields may be included in any of the data units 1000-1400 that are not illustrated in FIGS. 10-14, and one or more of the illustrated fields or symbols may be omitted from any of the data units 1000-1400.

Figure 15:
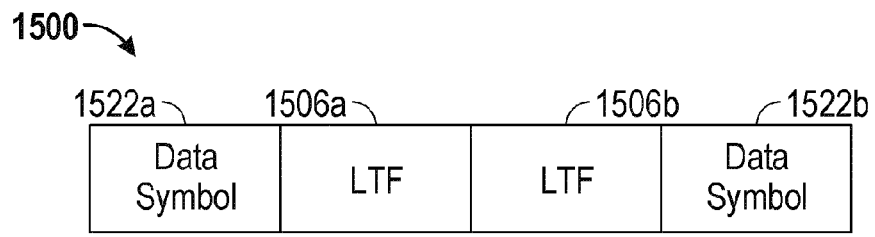
FIG. 15 illustrates an example portion of a physical layer data unit.

FIG. 15 illustrates an example portion 1500 of a data unit such as a PPDU for use with the wireless device 202. The portion 1500 may include a midamble comprising a first LTF 1506a followed by a second LTF 1506b. The portion 1500 may also include a preceding data symbol 1522a before the midamble and a following data symbol 1522b after the midamble. The first LTF 1506a and the second LTF 1506b may each have a duration of 1 OFDM symbol. In some aspects, the midamble may be inserted in the data of the data unit after every n data symbols, using one or more of the approaches discussed in this disclosure. The first LTF 1506a and the second LTF 1506b may function as the LTF, L-LTF, and VHT LTF described with respect to FIGS. 9, 10, 11, and 12, for example, and may include a channel estimation sequence and be used for channel estimation, among other functions.

In some aspects, it may be advantageous to include two additional LTFs (not shown) in the midamble to have four total LTFs. The additional LTFs may improve the accuracy of channel estimation. One scenario where additional LTFs may be beneficial may be in a 1 MHz 2× repetition mode (e.g., where a transmission coding of data symbols has a spectral efficiency lower than BPSK modulation with rate half coding, and a transmitter may transmit data units consecutively and may, in some cases, transmit two repetitions of each data unit).

Figure 16:
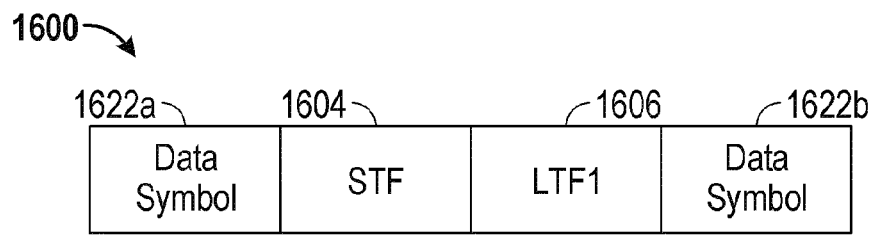
FIG. 16 illustrates an example portion of a physical layer data unit.

FIG. 16 illustrates an example portion 1600 of a data unit such as a PPDU for use with the wireless device 202. The portion 1600 of the data unit may be used in communication via a single spatial stream, for example. The portion 1600 may include a midamble comprising a STF 1604 followed by a LTF1 1606. The portion 1600 may also include a preceding data symbol 1622a before the midamble and a following data symbol 1622b after the midamble. In some aspects, the midamble may be inserted in the data of the data unit after every n data symbols, using one or more of the approaches discussed in this disclosure. In some aspects the LTF1 1606 may be followed by one or more additional LTFs.

The STF 1604 may function as or similarly to the VHT STF 1102 described with respect to FIG. 12, for example, and may include a gain control sequence and be used for gain setting, among other functions. The LTF 1606 may function as or similarly to the VHT LTFs 1006 described with respect to FIG. 12, for example, and may include a channel estimation sequence and be used for channel estimation, among other functions.

The STF 1604 may have a duration of 1 or 2 OFDM symbols, and the LTF1 1606 may each have a duration of 1, 2, or 4 OFDM symbols. The STF 1604 and LTF1 1606 may advantageously have a relatively longer duration (e.g., a duration of 2 OFDM symbols rather than 1 OFDM symbol) when robustness/reliability of a received signal is a higher priority than minimizing overhead of the received signal. In particular, the STF 1604 may have a relatively longer duration when, for instance, a received signal is relatively weak and more time for gain setting may improve gain setting. The LTF1 1606 may have a longer duration when, for instance, a channel is relatively noisy and a better channel estimation and re-estimating of the fine frequency offset may improve processing of data symbols. In addition, the STF 1604 and the LTF1 1606 may have a relatively longer duration of 2 OFDM symbols and 4 OFDM symbols, respectively, when operating in a 1 MHz 2× repetition mode since repetition mode may imply that reliability of the received signal is relatively important. On the other hand, the STF 1604 and the LTF1 1606 may have a relatively shorter duration of 1 OFDM symbol and 2 OFDM symbols, respectively, when operating in a normal mode 1 MHz mode or high bandwidth mode since normal mode may imply that reliability of the received signal may be of less concern.

Figure 17:
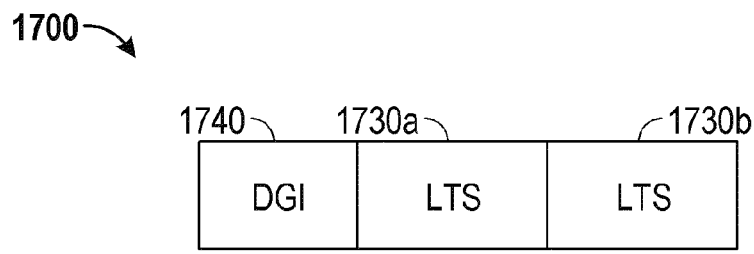
FIG. 17 illustrates an example long training field (LTF).

FIG. 17 illustrates an example long training field (LTF) 1700. The LTF 1700 shows an example composition of the LTF1 1606 of FIG. 16, for instance. The LTF 1700 may be advantageous for use in normal mode 1 MHz or higher bandwidth communication. The LTF 1700 may include a double guard interval (DGI) 1740 (e.g., a cyclic prefix having double a default duration) followed by a first long training symbol (LTS) 1730a, followed by a second LTS 1730b. The DGI may be a duration of 16 microseconds when a normal guard interval (GI) (e.g., a cyclic prefix having a default duration) may have a duration of 8 microseconds. The 16 microsecond DGI may be advantageous as part of the LTF 1700 because it may provide more time for AGC setting, channel estimation, and/or DC offset estimation than the normal GI of 8 microseconds.

Figure 18:
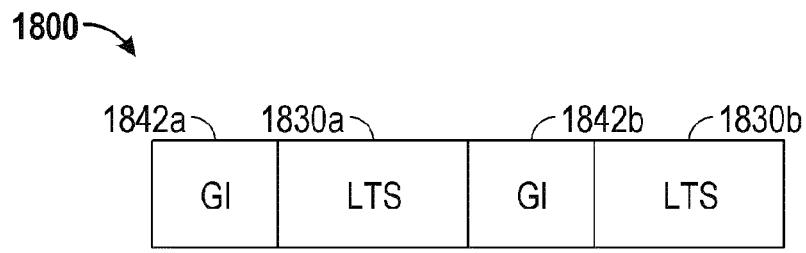
FIG. 18 illustrates an example LTF.

FIG. 18 illustrates an example LTF 1800. The LTF 1800 shows an example composition of the LTF1 1606 of FIG. 16, for instance. The LTF 1800 may be advantageous for use in normal mode 1 MHz or higher bandwidth communication. The LTF 1800 may include a first GI 1842a followed by a first LTS 1830a, followed by a second GI 1842b, followed by a second LTS 1830b. The GIs 1842 may each be a duration of 8 microseconds.

FIG. 19 illustrates an example LTF 1900. The LTF 1900 shows an example composition of the LTF1 1606 of FIG. 16, for instance. The LTF 1900 may be advantageous for use in repetition mode communication (e.g., where a transmission coding of data symbols has a spectral efficiency lower than BPSK modulation with rate half coding). The LTF 1900 may include a DGI 1940 followed by a first LTS 1930a, followed by a second LTS 1930b, followed by a first GI 1942a, followed by a third LTS 1930c, followed by a second GI 1942b, followed by a fourth LTS 1930d. The GI may be a duration of 8 microseconds. The DGI may be a duration of 16 microseconds and may equal two times the normal GI duration of 8 microseconds. The 16 microsecond DGI may be advantageous as part of the LTF 1900 because it may provide more time for AGC setting, channel estimation, and/or DC offset estimation than a normal GI of 8 microseconds.

FIG. 20 illustrates an example LTF 2000. The LTF 2000 shows an example composition of the LTF1 1606 of FIG. 16, for instance. The LTF 2000 may be advantageous for use in repetition mode communication (e.g., where a transmission coding of data symbols has a spectral efficiency lower than BPSK modulation with rate half coding). The LTF 2000 may include a first GI 2042a followed by a first LTS 2030a, followed by a second GI 2042b, followed by a second LTS 2030b, followed by a third GI 2042c, followed by a third LTS 2030c, followed by a fourth GI 2042d, followed by a fourth LTS 2030d. The GIs 2042 may each be a duration of 8 microseconds.

FIG. 21 illustrates an example portion 2100 of a data unit such as a PPDU for use with the wireless device 202. The portion 2100 of the data unit may be used in communication via multiple spatial streams and advantageously in a normal mode 1 MHz or higher bandwidth communication. The portion 2100 may include a midamble comprising a STF 2104 followed by one or more LTFs (LTF1, LTF2, . . . , LTFN) 2106. In some aspects, the N or number of LTFs 2106 may equal the number of spatial streams used in communication. The STF 2104 and each of the LTFs 2106 may have a duration of 1 OFDM symbol.

The portion 2100 may also include a preceding data symbol 2122a before the midamble and a following data symbol 2122b after the midamble. In some aspects, the midamble may be inserted in the data of the data unit after every n data symbols, using one or more of the approaches discussed in this disclosure.

Additionally, the STF 2104 may function as or similarly to the VHT STF 1102 described in FIG. 12, for example, and may include a gain control sequence and be used for gain setting, among other functions. The one or more LTFs 2106 may function as or similarly to the VHT LTFs 1006 described in FIG. 12, for example, and may include one or more channel estimation sequences and be used for channel estimation, among other functions.

FIG. 22 illustrates an example LTF 2200. The LTF 2200 shows an example composition of one of the LTF1 2106a or LTFN 2106n of FIG. 21, for instance. The LTF 2200 may include a GI 2242 followed by a LTS 2230. The GI may be a duration of 8 microseconds.

Figure 23:
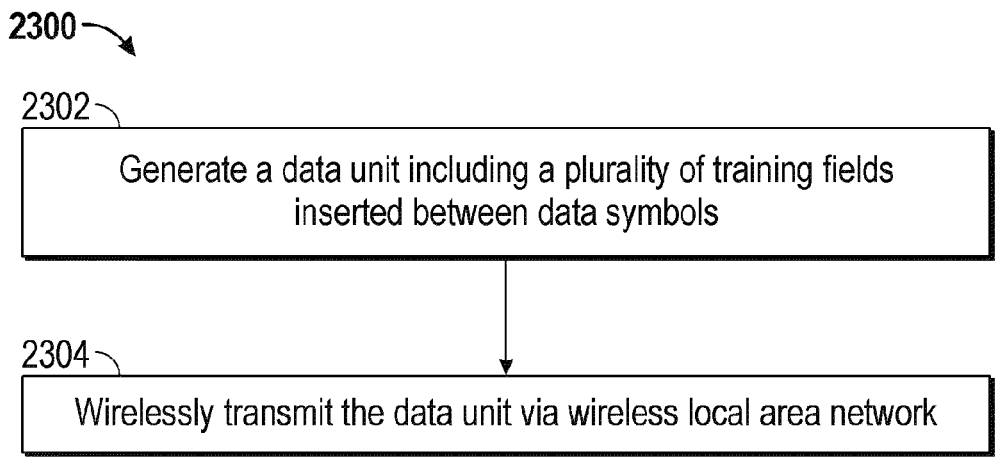
FIG. 23 illustrates a method for generating and transmitting a data unit.

FIG. 23 illustrates a method 2300 for generating and transmitting a data unit. The method 2300 may be used to generate the data units described above. The data units may be generated at either the AP 104 or the STA 106 and transmitted to another node in the wireless network 100. Although the method 2300 is described below with respect to elements of the wireless device 202a, other components may be used to implement one or more of the steps described herein.

At block 2302, a data unit is generated that includes a plurality of training fields inserted between data symbols. The generation may be performed by the processor 204 and/or the DSP 220, for example using the modulator 302 and the transform module 304. The plurality of training fields may comprise a first training field, such as a STF, that includes a gain control sequence and/or a second training field, such as a LTF, that includes a channel estimation sequence. The STF may comprise a VHT STF, and the LTF may comprise an L-LTF or a VHT LTF. The STF and/or the LTF may be inserted at regular intervals m and n, respectively, or at irregular intervals. The intervals and composition of the STF and/or LTF may be known or determined by the processor 204 or DSP 220 based on known information. In other aspects, the intervals and composition are determined based on an MCS, a number of spatial streams, a symbol duration and/or downclocking factor, a standardized number of bytes, and/or network conditions. The processor 204 or DSP 220 may insert an indicator signifying the interval or information that may be used to determine the interval or composition of the STF and/or LTF into a preamble of the data unit, for example, into a VHT SIGA field in the preamble. In some aspects, the processor 204 or DSP 220 inserts SIG fields between a plurality of the data symbols as well. A length or size of the data unit may be indicated by the processor 204 or DSP 220 in a legacy preamble of the data unit.

At block 2304, the data unit is wirelessly transmitted via wireless local area network. The transmission may be performed by the transmitter 210, for example.

Figure 24:
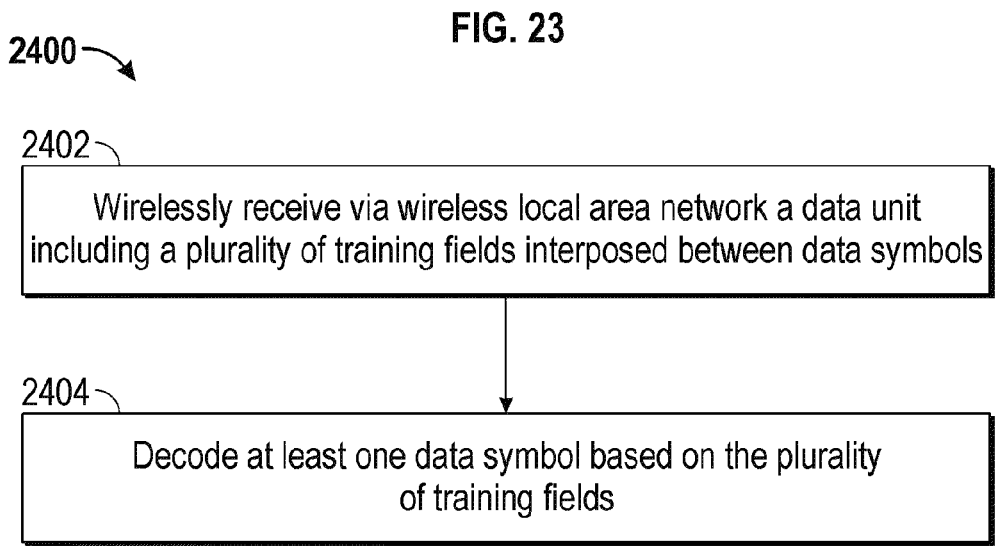
FIG. 24 illustrates a method for receiving and processing a data unit.

FIG. 24 illustrates a method 2400 for receiving and processing a data unit. The method 2400 may be used to receive the data units described above. The packets may be received at either the AP 104 or the STA 106 from another node in the wireless network 100. Although the method 2400 is described below with respect to elements of the wireless device 202b, other components may be used to implement one or more of the steps described herein.

At block 2402, a data unit is wirelessly received that includes a plurality of training fields interposed between data symbols. The reception may be performed by the receiver 220, for example, and may use the amplifier 401. The plurality of training fields may comprise a first training field, such as a STF, that includes a gain control sequence and a second training field, such as a LTF, that includes a channel estimation sequence. The STF may include a VHT STF, and the LTF may include an L-LTF or a VHT LTF. The STF and/or the LTF may be inserted at regular intervals m and n, respectively, or at irregular intervals. The data unit may include a preamble having a SIG field and in some aspects a VHT SIGA field.

At block 2404, at least one data symbol is decoded based at least in part on the plurality of training fields. The decoding may be performed by the processor 204, the signal detector 218, and/or the DSP 220, for example, using the transform module 404, the channel estimator and equalizer 405, and the demodulator 406. The intervals at which the training fields are interposed and composition of the STF and/or LTF may be known or determined by the processor 204 or DSP 220 based on known information. In other aspects, the processor 204 or DSP 220 may determine the interval or composition from information in a preamble of the data unit, for example, in a VHT SIGA field in the preamble. In some aspects, the processor 204 or DSP 220 is able to determine the location of a subsequent training field or and composition of the STF and/or LTF based on a SIG field that is also interposed between a plurality of the data symbols. The processor 204 or DSP 220 may determine a length or size of the data unit from a legacy preamble of the data unit.

If the data unit includes an interposed STF, the processor 204 or DSP 220 may adjust the gain of the receive amplifier 401 using automatic gain control, and may receive subsequent data symbols with the adjusted gain. If the data unit includes an interposed LTF, the channel estimator and equalizer may form an estimate of the channel over which the data unit is received. The channel estimate may be used by the processor 204 or DSP 220 to decode only subsequent data symbols, or may be used to decode both subsequent and preceding data symbols. In some aspects, the processor 204 or DSP 220 calculates an interpolation between two channel estimates, and uses that interpolation to decode the data symbols.

Figure 25:
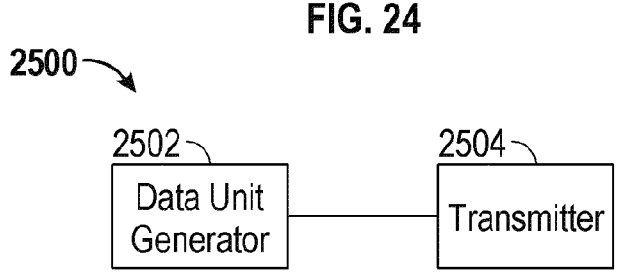
FIG. 25 is a functional block diagram of an exemplary device that may be employed within the wireless communication system of FIG. 1.

FIG. 25 is a functional block diagram of an exemplary device 2500 that may be employed within the wireless communication system 100. The device 2500 includes a data unit generator 2502 for generating a data unit for wireless transmission. The data unit generator 2502 may be configured to perform one or more of the functions discussed above with respect to the block 2302 illustrated in FIG. 23. The data unit generator 2502 may correspond to one or more of the processor 204 and the DSP 220. The device 2500 further includes a transmitter 2504 for wirelessly transmitting the data unit. The transmitter 2504 may be configured to perform one or more of the functions discussed above with respect to the block 2304 illustrated in FIG. 23. The transmitter 2504 may correspond to the transmitter 210.

Moreover, in one aspect, means for generating a data unit may comprise the data unit generator 2502. In another aspect, means for wireless transmitting the data unit via wireless local area network may comprise the transmitter 2504.

Figure 26:
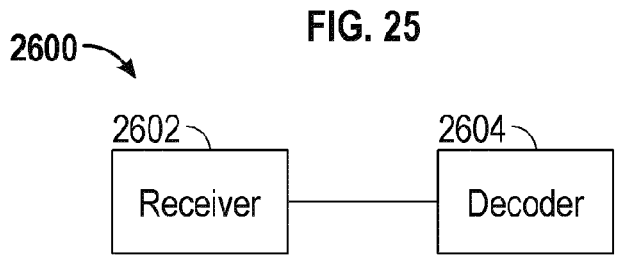
FIG. 26 is a functional block diagram of an exemplary device that may be employed within the wireless communication system of FIG. 1.

FIG. 26 is a functional block diagram of an exemplary device 2600 that may be employed within the wireless communication system 100. The device 2600 includes a receiver 2602 for wirelessly receiving a data unit including multiple training fields interposed between data symbols. The receiver 2602 may be configured to perform one or more of the functions discussed above with respect to the block 2402 illustrated in FIG. 24. The receiver 2602 may correspond to the receiver 212, and may include the amplifier 401. The device 2600 further comprises a decoder 2604 for decoding the data symbols of the data unit based at least in part on one or more of the multiple training fields interposed data symbols. The decoder 2604 may be configured to perform one or more of the functions discussed above with respect to the block 2402 illustrated in FIG. 24. The decoding module 2604 may correspond to one or more of the processor 204, the signal detector 218, and the DSP 220, and may including the channel estimator and equalizer 405.

Moreover, in one aspect, means for wirelessly receiving a data unit via wireless local area network may comprise the receiver 2602. In another aspect, means for decoding data symbols based on one or more training fields may comprise the decoder 2604.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
a receiver configured to wirelessly receive via a wireless local area network a physical layer protocol data unit, via one spatial stream, the physical layer protocol data unit comprising a plurality of training fields interposed between data symbols, the plurality of training fields being periodically repeated in the physical layer protocol data unit after a non-zero integer number of data symbols, the plurality of training fields comprising a first training field followed by a second training field, the first training field including a gain control sequence and having a duration of one orthogonal frequency-division multiplexing (OFDM) symbol, the second training field including a channel estimation sequence and having a duration of two OFDM symbols, the second training field comprising a double guard interval followed by a first training symbol and a second training symbol, wherein the receiver comprises an amplifier having a first gain and the receiver is further configured to perform automatic gain control using the first training field to adjust the first gain; and
a processor configured to decode at least one data symbol based on the plurality of training fields, wherein the plurality of training fields are received over a wireless channel and the processor is further configured to estimate a quality of the wireless channel based on the second training field and decode the at least one data symbol based on the estimated quality of the channel.

2. The apparatus of claim 1, wherein
the double guard interval has a duration of 16 microseconds.

3. An apparatus for wireless communication, comprising:
a receiver configured to wirelessly receive via wireless local area network a data unit comprising a plurality of training fields interposed between data symbols, the plurality of training fields comprising a first training field followed by a second training field, the first training field including a gain control sequence, the second training field including a channel estimation sequence; and
a processor configured to decode at least one data symbol based on the plurality of training fields, wherein a transmission coding of the data symbols has a spectral efficiency lower than binary phase-shift keying (BPSK) modulation with rate half coding, and the first training field has a duration of two orthogonal frequency-division multiplexing (OFDM) symbols and the second training field has a duration of four OFDM symbols.

4. The apparatus of claim 3, wherein the second training field comprises a double guard interval followed by a first training symbol and a second training symbol, followed by a first guard interval, followed by a third training symbol, followed by a second guard interval, followed by a fourth training symbol.

5. The apparatus of claim 3, wherein the second training field comprises a first guard interval followed by a first training symbol, followed by a second guard interval, followed by a second training symbol, followed by a third guard interval, followed by a third training symbol, followed by a fourth guard interval, followed by a fourth training symbol.

6. An apparatus for wireless communication, comprising:
a processor configured to generate a physical layer protocol data unit comprising a plurality of training fields inserted between data symbols, the plurality of training fields being periodically repeated in the physical layer protocol data unit after a non-zero integer number of data symbols, the plurality of training fields comprising a first training field having a duration of one orthogonal frequency-division multiplexing (OFDM) symbol followed by a second training field having a duration of two OFDM symbols, the second training field comprising a double guard interval followed by a first training symbol and a second training symbol, the first training field including a gain control sequence, the second training field including a channel estimation sequence; and
a transmitter configured to wirelessly transmit, via one spatial stream, the physical layer protocol data unit via a wireless local area network.

7. The apparatus of claim 6, wherein
the double guard interval has a duration of 16 microseconds.

8. An apparatus for wireless communication, comprising:
a processor configured to generate a data unit comprising a plurality of training fields inserted between data symbols, the plurality of training fields comprising a first training field followed by a second training field, the first training field including a gain control sequence, the second training field including a channel estimation sequence; and
a transmitter configured to wirelessly transmit the data unit via wireless local area network, wherein a transmission coding of the data symbols has a spectral efficiency lower than binary phase-shift keying (BPSK) modulation with rate half coding, and the first training field has a duration of two orthogonal frequency-division multiplexing (OFDM) symbols and the second training field has a duration of four OFDM symbols.

9. The apparatus of claim 8, wherein the second training field comprises a double guard interval followed by a first training symbol and a second training symbol, followed by a first guard interval, followed by a third training symbol, followed by a second guard interval, followed by a fourth training symbol.

10. The apparatus of claim 8, wherein the second training field comprises a first guard interval followed by a first training symbol, followed by a second guard interval, followed by a second training symbol, followed by a third guard interval, followed by a third training symbol, followed by a fourth guard interval, followed by a fourth training symbol.

11. A method of wireless communication, comprising:
wirelessly receiving via a wireless local area network, via one spatial stream, a physical layer protocol data unit over a wireless channel, the physical layer protocol data unit comprising a plurality of training fields interposed between data symbols, the plurality of training fields being periodically repeated in the data unit after a non-zero integer number of data symbols, the plurality of training fields comprising a first training field having a duration of one orthogonal frequency-division multiplexing (OFDM) symbol followed by a second training field having a duration of two OFDM symbols, the second training field comprising a double guard interval followed by a first training symbol and a second training symbol, the first training field including a gain control sequence, the second training field including a channel estimation sequence;

estimating a quality of the wireless channel based on the second training field;

decoding at least one data symbol based on the plurality of training fields and based on the estimated quality of the wireless channel;

performing automatic gain control using the first training field to adjust a first gain of an amplifier of a receiver; and receiving at least one data symbol using the receiver after the first gain is adjusted.

12. The method of claim 11,
wherein the double guard interval has a duration of 16 microseconds.

13. A method of wireless communication, comprising:
wirelessly receiving via wireless local area network a data unit comprising a plurality of training fields interposed between data symbols, the plurality of training fields comprising a first training field followed by a second training field, the first training field including a gain control sequence, the second training field including a channel estimation sequence; and decoding at least one data symbol based on the plurality of training fields, wherein a transmission coding of the data symbols has a spectral efficiency lower than binary phase-shift keying (BPSK) modulation with rate half coding, and the first training field has a duration of two orthogonal frequency-division multiplexing (OFDM) symbols and the second training field has a duration of four OFDM symbols.

14. The method of claim 13, wherein the second training field comprises a double guard interval followed by a first training symbol and a second training symbol, followed by a first guard interval, followed by a third training symbol, followed by a second guard interval, followed by a fourth training symbol.

15. The method of claim 13, wherein the second training field comprises a first guard interval followed by a first training symbol, followed by a second guard interval, followed by a second training symbol, followed by a third guard interval, followed by a third training symbol, followed by a fourth guard interval, followed by a fourth training symbol.

16. A method of wireless communication, comprising:
generating a physical layer protocol data unit comprising a plurality of training fields inserted between data symbols, the plurality of training fields being periodically repeated in the data unit after a non-zero integer number of data symbols, the plurality of training fields comprising a first training field haings a duration of one orthogonal frequency-division multiplexing (OFDM) symbol followed by a second training field having a duration of two OFDM symbols, the second training field comprising a double guard interval followed by a first training symbol and a second training symbol, the first training field including a gain control sequence, the second training field including a channel estimation sequence; and wirelessly transmitting via a wireless local area network the physical layer protocol data unit via one spatial stream.

17. The method of claim 16, wherein
the double guard interval has a duration of 16 microseconds.

18. A method of wireless communication, comprising:
generating a data unit comprising a plurality of training fields inserted between data symbols, the plurality of training fields comprising a first training field followed by a second training field, the first training field including a gain control sequence, the second training field including a channel estimation sequence; and wirelessly transmitting via wireless local area network the data unit, wherein a transmission coding of the data symbols has a spectral efficiency lower than binary phase-shift keying (BPSK) modulation with rate half coding, and the first training field has a duration of two orthogonal frequency-division multiplexing (OFDM) symbols, and the second training field has a duration of four orthogonal frequency-division multiplexing (OFDM) symbols.

19. The method of claim 18, wherein the second training field comprises a double guard interval followed by a first training symbol and a second training symbol, followed by a first guard interval, followed by a third training symbol, followed by a second guard interval, followed by a fourth training symbol.

20. The method of claim 18, wherein the second training field comprises a first guard interval followed by a first training symbol, followed by a second guard interval, followed by a second training symbol, followed by a third guard interval, followed by a third training symbol, followed by a fourth guard interval, followed by a fourth training symbol.

* * * * *